(12) United States Patent
Self et al.

(10) Patent No.: US 10,157,550 B2
(45) Date of Patent: *Dec. 18, 2018

(54) METHOD AND SYSTEM FOR PRESENTING INTERACTIVE, THREE-DIMENSIONAL LEARNING TOOLS

(71) Applicant: ALIVE STUDIOS, LLC, Dacula, GA (US)

(72) Inventors: Jonathan Randall Self, Doraville, GA (US); Cynthia Bertucci Kaye, Dacula, GA (US); Craig M. Selby, Marietta, GA (US); James Simpson, Atlanta, GA (US)

(73) Assignee: ALIVE STUDIOS, LLC, Dacula, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/341,153

(22) Filed: Nov. 2, 2016

(65) Prior Publication Data

US 2017/0236433 A1    Aug. 17, 2017

Related U.S. Application Data

(63) Continuation of application No. 12/985,582, filed on Jan. 6, 2011, now Pat. No. 9,514,654.

(60) Provisional application No. 61/364,000, filed on Jul. 13, 2010, provisional application No. 61/394,429, filed on Oct. 19, 2010.

(51) Int. Cl.
  *G09B 5/02* (2006.01)
  *G09B 7/00* (2006.01)

(52) U.S. Cl.
  CPC .............. *G09B 5/02* (2013.01); *G09B 7/00* (2013.01)

(58) Field of Classification Search
  USPC ......................................... 434/171, 172, 365
  See application file for complete search history.

(56) References Cited

U.S. PATENT DOCUMENTS

D613,301 S * 4/2010 Lee .............................. D14/489

* cited by examiner

*Primary Examiner* — Kesha Frisby
(74) *Attorney, Agent, or Firm* — Smith, Gambrell & Russell, LLP

(57) ABSTRACT

A system includes an education module (171) that is operable with, includes, or is operable to control three-dimensional figure generation software (170). The education module (171) is configured to present an educational three-dimensional object (181) on a display (132) upon detecting an educational flash card (150) being disposed before a camera (130) that is operable with the education module (171). The educational three-dimensional object (181) can correspond to a visible graphic (151) disposed on the educational flash card (150) to provide an educational experience to a student.

19 Claims, 25 Drawing Sheets

US 10,157,550 B2

METHOD AND SYSTEM FOR PRESENTING INTERACTIVE, THREE-DIMENSIONAL LEARNING TOOLS

CROSS REFERENCE TO PRIOR APPLICATIONS

This application claims priority and benefit to U.S. Nonprovisional application Ser. No. 12/985,582, filed Jan. 6, 2011, now U.S. Pat. No. 9,514,654, which claims priority to U.S. Provisional Application No. 61/364,000, filed Jul. 13, 2010, and U.S. Provisional Application No. 61/394,429, filed Oct. 19, 2010, the disclosure of each which is relied upon and incorporated herein by reference.

BACKGROUND

Technical Field

This invention relates generally to interactive learning tools, and more particularly to a three-dimensional interactive learning system and corresponding method therefore.

Background Art

Margaret McNamara coined the phrase "reading is fundamental." On a more basic level, it is learning that is fundamental. Children and adults alike must continue to learn to grow, thrive, and prosper.

Traditionally learning occurred when a teacher presented information to students on a blackboard in a classroom. The teacher would explain the information while the students took notes. The students might ask questions. This is how information was transferred from teacher to student. In short, this was traditionally how students learned.

While this method worked well in practice, it has its limitations. First, the process requires students to gather in a formal environment and appointed times to learn. Second, some students may find the process of ingesting information from a blackboard to be boring or tedious.

Third, students that are too young for the classroom may not be able to participate in such a traditional process.

There is thus a need for a learning tool and corresponding method that overcomes the aforementioned issues.

Figure 1:
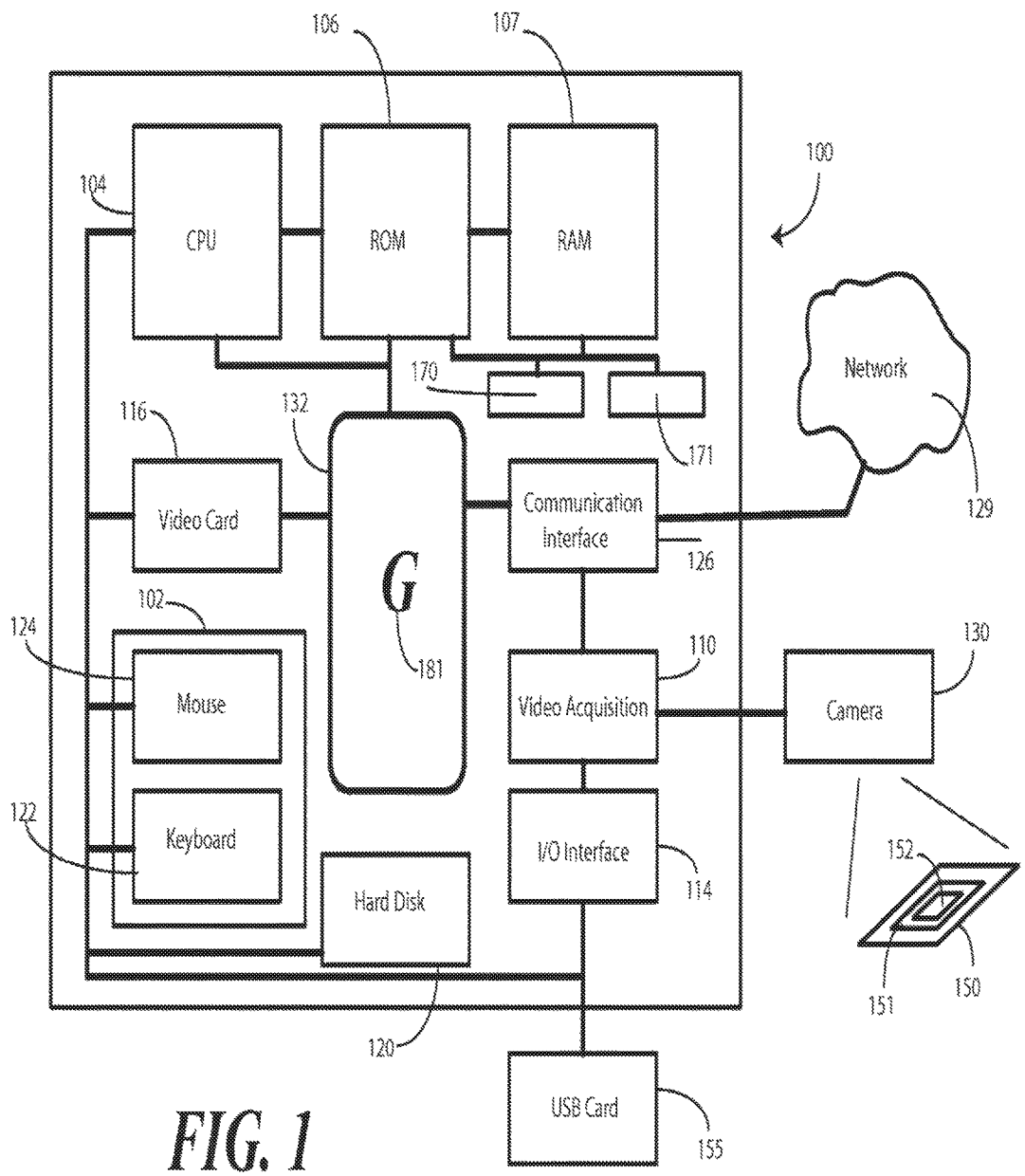
FIG. 1 illustrated one embodiment of a system configured in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a three-dimensional interactive learning tool system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of providing output from a three-dimensional interactive learning tool system as described herein. The non-processor circuits may include, but are not limited to, a camera, a computer, USB devices, audio outputs, signal drivers, clock circuits, power source circuits, and user input devices. As such, these functions may be interpreted as steps of a method to perform the delivery of output from a three-dimensional interactive learning tool system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a learning tool that employs three-dimensional imagery on a computer screen that is triggered when a pre-defined educational flash card is presented before a camera. The educational flash card causes a corresponding three-dimensional object to appear on a computer screen. Illustrating by way of example, where the flash card represents the letter "G," placing the flash card before a camera can make the letter "G" appear as a three-dimensional object atop the flash card on the computer's screen. Alternatively, other objects associated with the letter G, such as giraffes, gorillas, goldfish, golf balls, gold bricks, and the like, can appear as three-dimensional images atop the flash card.

In one embodiment, a first object can appear. The first object can then be followed by a transition to a second object. Continuing the example from above, when a flash card corresponding to the letter G is placed before a camera, the letter G may initially appear atop the flash card. After a predetermined amount of time, this object may transition to another object. For instance, the three-dimensional letter G may transition to a three-dimensional giraffe. Additionally, sound effects or animation can be added such that the letter G does a dance or the giraffe walks or eats from a tree. Further, the giraffe may bellow.

Embodiments of the present invention provide interactive educational tools that combine multiple educational modalities, e.g., visual, tactual, auditory, and/or kinetic, to form an engaging, exciting, and interactive world for today's student. Embodiments of the invention can comprise flash cards configured to cause a corresponding educational three-dimensional image to be presented on a computer screen, posters configured to cause a corresponding educational three-dimensional image to be presented on a computer screen, an image disposed on apparel configured to cause a corresponding educational three-dimensional image to be presented on a computer screen, or a book or toy that is configured to cause a corresponding educational three-dimensional image to be presented on a computer screen.

Turning now to FIG. 1, illustrated therein is one embodiment of a system configured in accordance with embodiments of the invention. The system includes illustrative equipment suitable for carrying out the methods and for constructing the apparatuses described herein. It should be understood that the illustrative system is used for simplicity of discussion. Those of ordinary skill in the art having the benefit of this disclosure will readily identify other, different systems with similar functionality that could be substituted for the illustrative equipment described herein.

In one embodiment of the system, a device 100 is provided. Examples of the device 100 include a personal computer, microcomputer, a workstation, a gaming device, or portable computer. In one embodiment, a communication bus, shown illustratively with black lines in FIG. 1, permits communication and interaction between the various components of the device 100. The communication bus enables components to communicate instructions to any other component of the device 100 either directly or via another component. For example, a controller 104, which can be a microprocessor, combination of processors, or other type of computational processor, retrieves executable instructions stored in one or more of a read-only memory 106 or random-access memory 108.

The controller 104 uses the executable instructions to control and direct execution of the various components. For example, when the device 100 is turned ON, the controller 104 may retrieve one or more programs stored in a nonvolatile memory to initialize and activate the other components of the system. The executable instructions can be configured as software or firmware and can be written as executable code. In one embodiment, the read-only memory 106 may contain the operating system for the controller 104 or select programs used in the operation of the device 100. The random-access memory 108 can contain registers that are configured to store information, parameters, and variables that are created and modified during the execution of the operating system and programs.

The device 100 can optionally also include other elements as will be described below, including a hard disk to store programs and/or data that has been processed or is to be processed, a keyboard and/or mouse or other pointing device that allows a user to interact with the device 100 and programs, a touch-sensitive screen or a remote control, one or more communication interfaces adapted to transmit and receive data with one or more devices or networks, and memory card readers adapted to write or read data.

A video card 110 is coupled to a camera 130. The camera 130, in one embodiment, can be any type of computer-operable camera having a suitable frame capture rate and resolution. For instance, in one embodiment the camera 130 can be a web camera or document camera. In one embodiment, the frame capture rate should be at least twenty frames per second. Cameras having a frame capture rate of between 20 and 60 frames per second are well for use with embodiments of the invention, although other frame rates can be used as well.

The camera 130 is configured to take consecutive images and to deliver image data to an input of the device 100. This image data is then delivered to the video card for processing and storage in memory. In one embodiment, the image data comprises one or more images of educational flash cards 150 or other similar objects that are placed before the lens of the camera 130.

As will be described in more detail below, an education module 171, working with a three-dimensional figure generation program 170, is configured to detect a character, object, or image disposed on one or more of the educational flash cards 150 from the images of the camera 130 or image data corresponding thereto. The education module 171 then controls the three-dimensional figure generation program 170 to augment the image data by inserting a two-dimensional representation of an educational three-dimensional object into the image data to create augmented image data.

In one embodiment, the three-dimensional figure generation program 170 can be configured to generate the two-dimensional representation of the educational three-dimensional object in response to instructions from the education module 171. In another embodiment, the three-dimensional figure generation program 170 can be configured to retrieve predefined three-dimensional objects from the read-only memory 106 or the hard disk 120 in response to instructions from the education module 171.

In one embodiment, the educational three-dimensional object corresponds to the detected character, object, or image disposed on the educational flash cards 150. Said differently, the educational three-dimensional object and detected character, object, or image can be related by a predetermined criterion. For example, where the detected character, object, or image comprises a grammatical character, the education module 171 can be configured to augment the image data by causing the three-dimensional figure generation program 170 to insert a two-dimensional representation of an educational three-dimensional object into the image data to create augmented image data by selecting a three-dimensional object that is related by a predetermined grammatical criterion, such as a common first letter. Where the detected character, object, or image can comprise one or more words, the education module 171 can be configured to detect the one or more words from the image data and to augment the image data by presenting a two-dimensional representation of the one or more words in a presentation region of augmented image data. Where the detected character, object, or image comprises a letter, the education module 171 can be configured to augment the image data by causing the three-dimensional figure generation program 170 to superimpose a two-dimensional representation of a three-dimensional embodiment of the letter on an image of the educational flash card 150. Other techniques for triggering the presentation of three-dimensional educational images on a display 132 will be described herein.

A user interface 102, which can include a mouse 124, keyboard 122, or other device, allows a user to manipulate the device 100 and educational programs described herein. A communication interface 126 can provide various forms of output such as audio output. A communication network 128, such as the Internet, may be coupled to the device for the delivery of data. The executable code and data of each program enabling the education module 171 and the other interactive three-dimensional learning tools can be stored on any of the hard disk 120, the read-only memory 106, or the random-access memory 108.

In one embodiment, the education module 171, and optionally the three-dimensional figure generation program 170, can be stored in an external device, such as USB card 155, which is configured as a non-volatile memory. In such an embodiment, the controller 104 may retrieve the executable code comprising the education module 171 and three-dimensional figure generation program 170 through a card interface 114 when the read-only USB device 155 is coupled to the card interface 114. In one embodiment, the controller 104 controls and directs execution of the instructions or software code portions of the program or programs of the interactive three-dimensional learning tool.

In one embodiment, the education module 171 includes an integrated three-dimensional figure generation program 170. Alternatively, the education module 171 can operate, or be operable with, a separate three-dimensional figure generation program 170. Three-dimensional figure generation programs 170, sometimes referred to as an "augmented reality programs," are available from a variety of vendors. For example, the principle of real time insertion of a virtual object into an image coming from a camera or other video acquisition means using that software is described in patent application WO/2004/012445, entitled "Method and System Enabling Real Time Mixing of Synthetic Images and Video Images by a User." In one embodiment, three-dimensional figure generation program 170, such as that manufactured by Total Immersion under the brand name D'Fusion®, is operable on the device 100.

In one embodiment of a computer-implemented method of teaching grammar using the education module 171, a user places one or more educational flash cards 150 before the camera 130. The visible object 151 disposed on the educational flash cards 150 can be a photograph, picture or other graphic. The visible object 151 can be configured as any number of objects, including colored background shapes, patterned objects, pictures, computer graphic images, and so forth. Similarly, the special marker 152 can comprise a photograph, picture, letter, word, symbol, character, object, silhouette, or other visual marker. In one embodiment, the special marker 152 is embedded into the visible object 151.

The education module 171 receives one or more video images of the educational flash card 150 as image data delivered from the camera 130. The camera 130 captures one or more video images of the educational flash card 150 and delivers corresponding image data to the education module 171 through a suitable camera-device interface.

The education module 171, by controlling, comprising, or being operable with the three-dimensional object generation software 170, then augments the one or more video images—or the image data corresponding thereto—for presentation on the display 132 by, in one embodiment, superimposing a two-dimensional representation of an educational three-dimensional object 181 on an image of the educational flash card 150. The augmented image data is then presented on the display 132. To the user, this appears as if a three-dimensional object has suddenly "appeared" and is sitting atop the image of the educational flash card 150.

Illustrating by way of one simple example, in one embodiment the special marker 152 is a letter, such as the letter "G" shown in FIG. 1. The education module 171 captures one or more images, e.g., a static image or video, of the educational flash card having the "G" disposed thereon and identifies the "G." The education module 171 then augments the one or more video images by causing the three-dimensional figure generation program 170 to superimpose a two-dimensional representation of an educational three-dimensional object on an image of the educational flash card 150. The educational three-dimensional object 181 is presented on the display 132 atop an image of the educational flash card 150.

In one embodiment, the predetermined criterion correlating the educational three-dimensional object 181 and the visible object 151 and/or special marker 152 is a common first letter. Where the special marker 152 is the letter "G," the educational three-dimensional object 181 can be configured to be an animal. The animal can be a giraffe, gnu, gazelle, goat, gopher, groundhog, guppy, gorilla, or other animal that begins with the letter "G." By superimposing a two-dimensional representation of the animal on the card, it appears—at least on the display 132—as if a three-dimensional animal is sitting atop the card. The education module 171 can even animate the animal. This example is useful for teaching children grammar. A student may first read the visible graphic 151 and/or special marker 152 when configured as a letter or word. The student may then see an educational three-dimensional object 181 on the display 132 to confirm whether the read information was correct. In so doing, the system of FIG. 1 and corresponding computer-implemented method of teaching provides a fun, interactive learning system by which students can learn the alphabet, how to read, foreign languages, and so forth. The system and method can also be configured as an educational game.

In one embodiment, the educational three-dimensional object 181 can be molded or textured as desired by way of the education module 171. Further, the educational three-dimensional object 181 can appear as different colors or can be animated. Using letters as an example, in one embodiment consonants can appear blue while vowels appear red, and so forth.

As noted above, where letters and animals are used, the letter and the animal can correspond by the animal's name beginning with the letter. For example, the letter "A" can correspond to an alligator, while the letter "B" corresponds to a bear. The letter "C" can correspond to a cow, while the letter "D" corresponds to a dolphin. The letter "E" can correspond to an elephant, while the letter "F" corresponds to a frog. The letter "G" can correspond to a giraffe, while the letter "H" can correspond to a horse. The letter "I" can correspond to an iguana, while the letter "J" corresponds to a jaguar. The letter "K" can correspond to a kangaroo, while the letter "L" corresponds to a lion. The letter "M" can correspond to a moose, while the letter "N" corresponds to a needlefish. The letter "O" can correspond to an orangutan, while the letter "P" can correspond to a peacock. The letter "R" can correspond to a rooster, while the letter "S" can correspond to a shark. The letter "T" can correspond to a toucan, while the letter "U" can correspond to an upland gorilla or a unau (sloth). The letter "V" can correspond to a vulture, while the letter "W" can correspond to a wolf. The letter "Y" can correspond to a yak, while the letter "Z" can correspond to a zebra. These examples are illustrative only. Others correspondence criterion will be readily apparent to those of ordinary skill in the art having the benefit of this disclosure.

In one embodiment, the education module 171 can cause audible sounds to emit from the device 100. For example, when a letter appears on the educational flash card 150, such as a building when the letter "B" is on the educational flash card 150, the education module 171 can generate a signal representative of an audible pronunciation of a voice stating, "This is a building" suitable for emission from a loudspeaker. Alternatively, phonetic sounds or pronunciations of the name of the building can be generated. In one embodiment described below, the user can choose which signal is generated by the selection of one or more actuation targets disposed along the educational flash card 150.

In another audio example, presume that the visible graphic 151 is the letter "L." In one embodiment, a lion may appear as the educational three-dimensional object 181. A voiceover may say, "Lion," or "This is a lion," or "Let's hear the mighty lion roar." Alternatively, an indigenous sound made by the animal, such as a lion's roar, may be played in addition to, or instead of, the voice over. Further, ambient sounds for the animal's indigenous environment, such as jungle sounds in this illustrative example, may be played as well.

Figure 2:
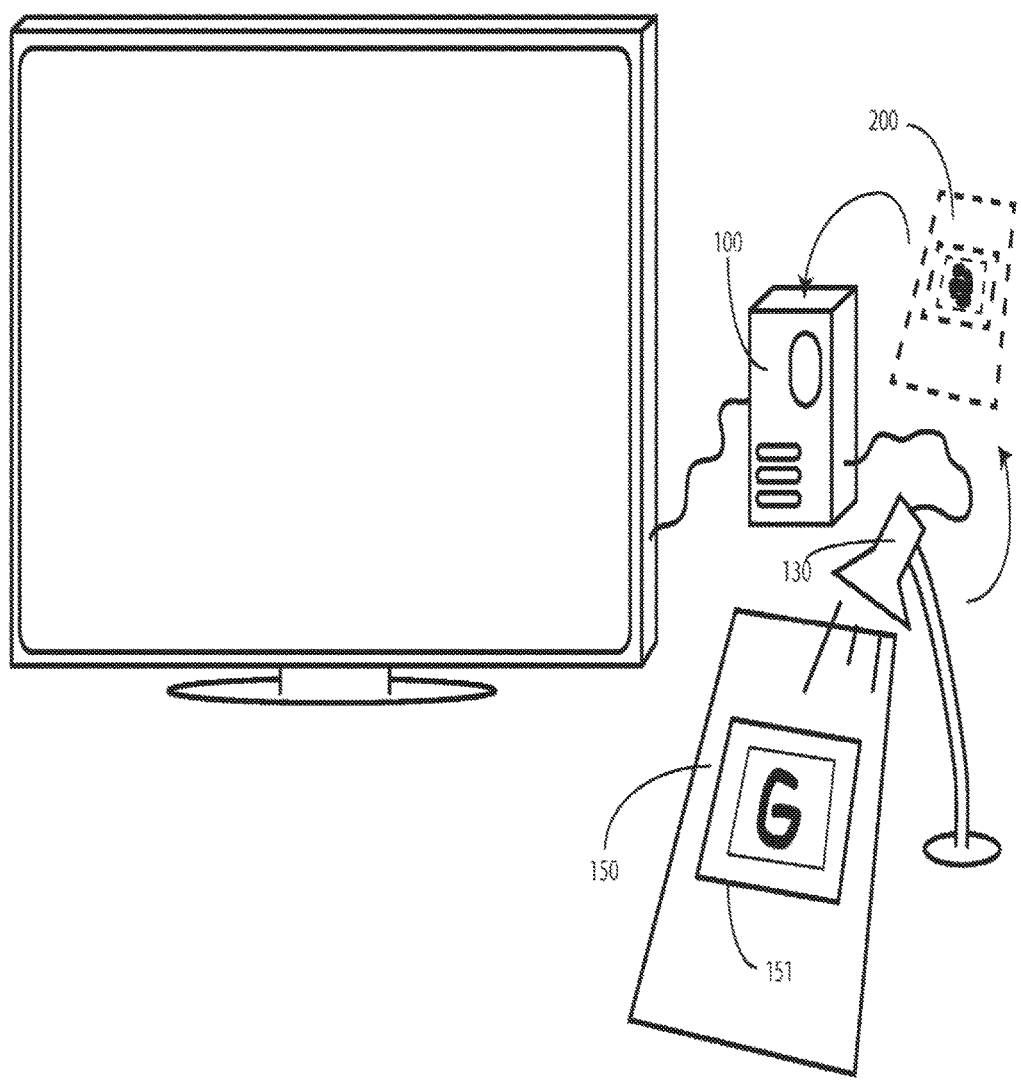
FIG. 2 illustrates one embodiment of a flash card suitable for use with a three-dimensional interactive learning tool system configured in accordance with embodiments of the invention.
Figure 3:
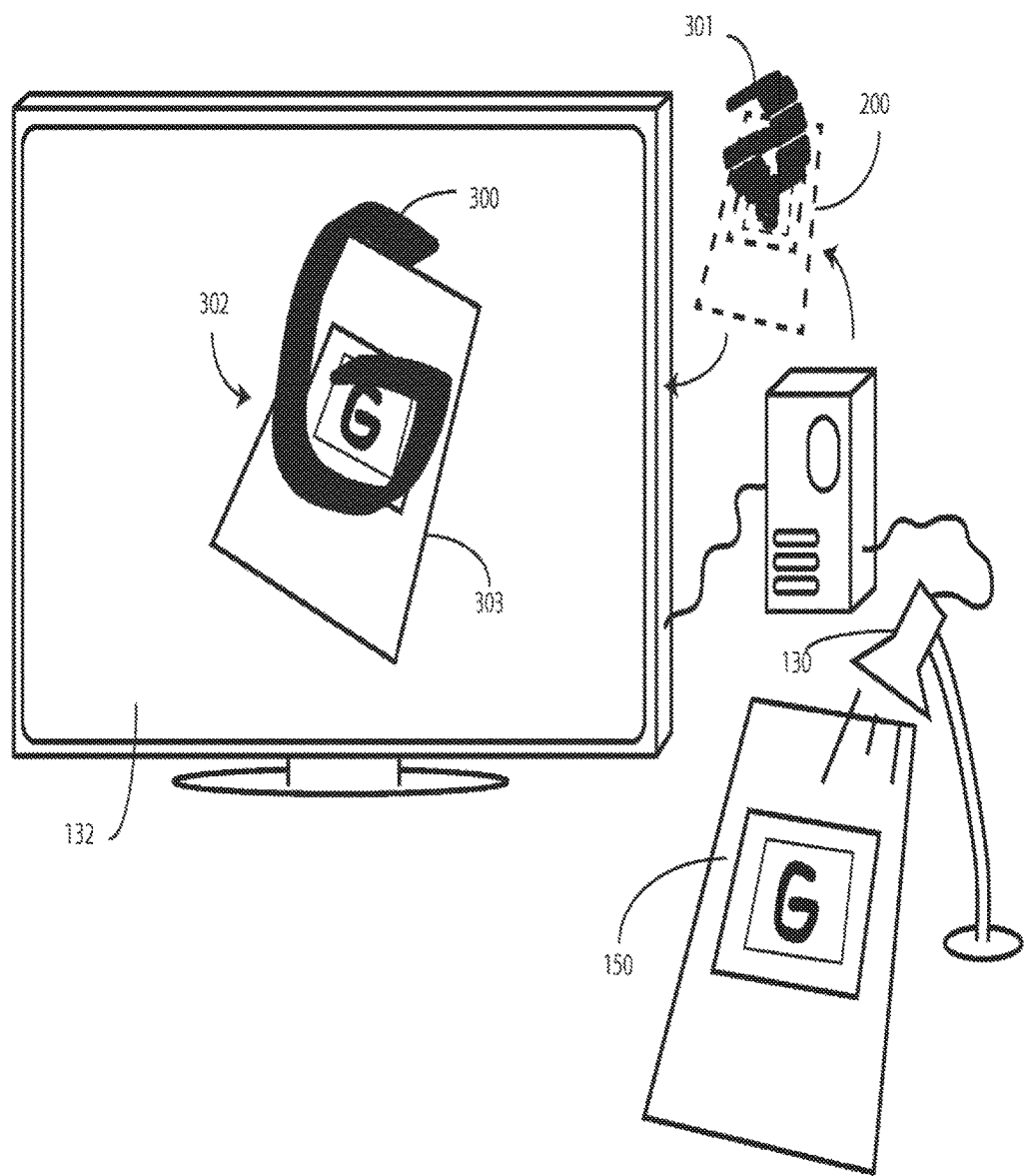
FIG. 3 illustrates one output result of a flash card being used with a three-dimensional interactive learning tool system in accordance with embodiments of the invention.

Turning now to FIGS. 2 and 3, illustrated therein are the steps of one exemplary computer-implemented method of teaching. Beginning with FIG. 2, the camera 130 captures an image, represented electronically by image data 200. As shown in FIG. 2, the image data 200 corresponds to an image of an educational flash card 150. The image data 200 can be from one of a series of images, such as where the camera 130 is capturing video. The image data 200 is then delivered to the device 100 having the education module (171) operable therein.

As noted above, the visible object 151 can comprise a special marker (152). In this illustrative embodiment, the visible object 151 comprises an image of the letter "G." The image data 200 includes the visible object 151 and special marker (152).

The education module (171) then augments the one or more video images for presentation on a display by causing the three-dimensional figure generation software (170) to superimpose a two-dimensional representation of an educational three-dimensional object on an image of the educational flash card. (In the discussion below, the education module (171) will be described as doing the superimposing. However, it will be understood that this occurs in conjunction with the three-dimensional figure generation software (170) as described above.)

In this example, this causes a two-dimensional representation of a three-dimensional letter to appear modeled in upper case. Turning now to FIG. 3, one example of such letter 301 is shown. The letter 301 is superimposed atop the image 200. On the display 132, a blue "G" 300 is shown and appears to be a three-dimensional object. The "G" 300 appears to be sitting atop an image 303 of the educational flash card 150. As an alternative to the display 132, the "G" 300 could likewise be displayed via an external device, such as through a projector or on an interactive white board.

In one embodiment, the letter 301 is configured by the education module (171) to be fun, whimsical looking, and brightly colored. In another embodiment, the letter may feature texturing that resembles the animal that the letter represents. In one embodiment, a sound effect plays that vocalizes the name of the letter and the phonic sounds the letter makes. Such sounds can be recorded clearly and correctly in plain a student's native language, such as by a female voice with no accents. The sounds can be repeated for reinforcement by pressing the appropriate key on the keyboard, or alternatively by covering one or more user actuation targets disposed on the educational flash card 150.

In one embodiment, the education module (171) can be configured to detect movement of the educational flash card 150. For example, if a student picks up the educational flash card 150 and moves it side to side beneath the camera 130, the education module (171) can be configured to detect this motion from the image data 200 and can cause the letter 301 to move in a corresponding manner. Similarly, the education module (171) can be configured to cause the letter 301 to rotate when the student rotates the educational flash card 150. Likewise, the education module (171) can be configured to tilt the letter 301 when the educational flash card 150 is tilted, in a corresponding amount. This motion works to expand the interactive learning environment provided by embodiments of the present invention.

In one embodiment, the education module (171) can be configured to cause an animal associated with the letter to appear, such as by transition animation. The appearance of the animal can be automatic, upon detection of the "G" 300, after a default period of time, after presentation of the letter "G" 300 for at least a predetermined time, through user interaction via a key on the keyboard (122) or mouse, or by other stimulus input. Such an animal is shown in FIG. 4.

Figure 4:
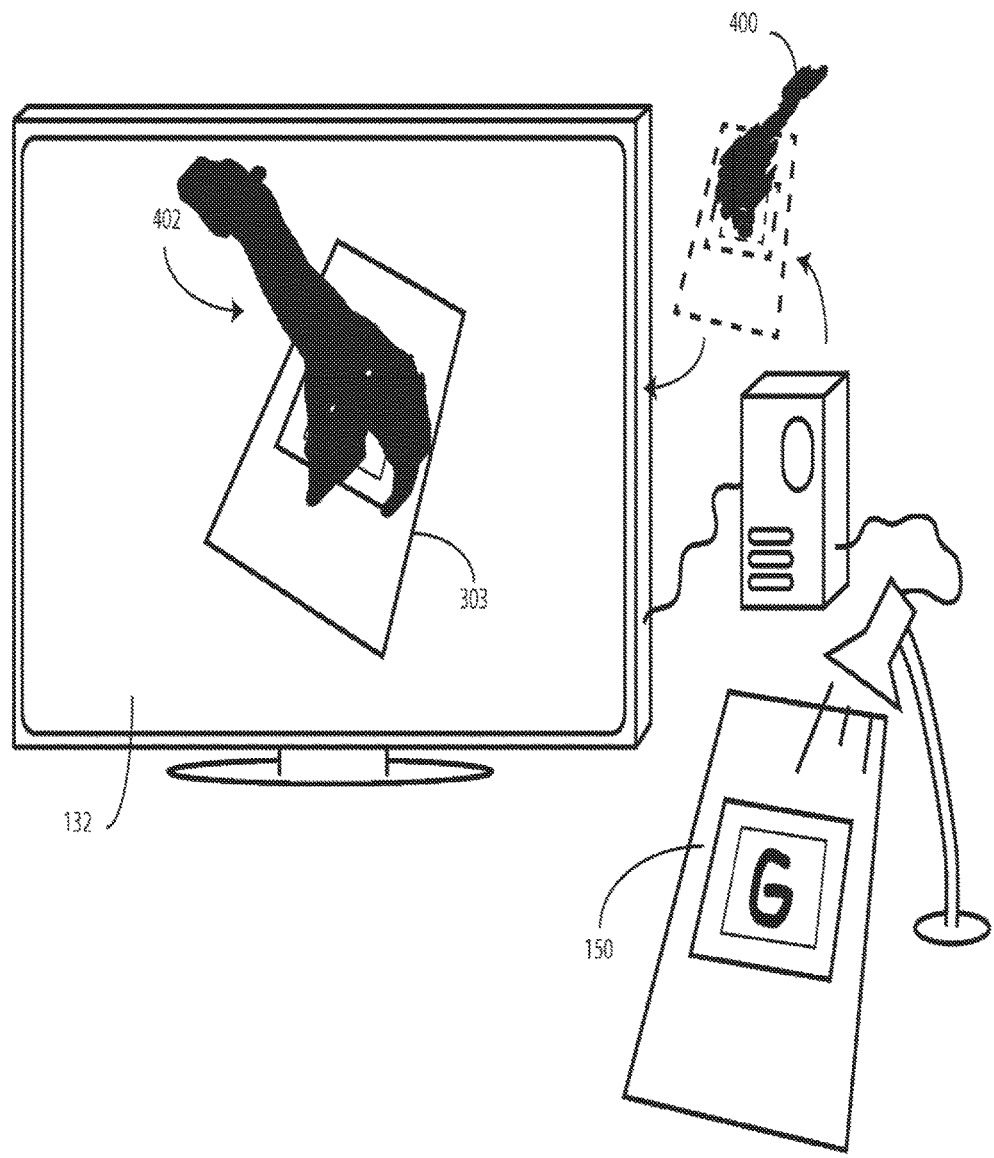
FIG. 4 illustrates another output result from a flash card being used with a three-dimensional interactive learning tool system in accordance with embodiments of the invention.

Turning now to FIG. 4, a giraffe 400 is shown as the animal. A two-dimensional representation of a three-dimensional giraffe 402 is shown on the display 132 standing on the image 303 of the educational flash card 150. In one embodiment, the animal can be modeled by the education module (171) as a three-dimensional model that is created by the three-dimensional figure generation program (170). In another embodiment, the animal can be stored in memory as a pre-defined three-dimensional model that is retrieved by the three-dimensional figure generation program (170). The education module (171) can be configured so that the animal is textured and has an accurate animation of how the animal moves. In one embodiment, the customized education module can be configured to play sound effects, such as speech announcing the animal's name. Alternatively, the sound effects can play the sound it typically makes. As noted above, an ambient sound can be configured to loop in the background to provide an idea of the environment of where the animal lives. The sounds can be repeated via the keyboard and the background sounds can be toggled on or off.

In one embodiment, the education module (171) can be configured to interact in groups to teach the spelling of words. For example, if the user presents three educational flash cards with "C" "A" and "T" to the web or document camera in the correct order, a sound effect should play and a three-dimensional modeled image of a cat will be displayed.

In one embodiment, the user interface displayed on the screen will be intentionally minimalist in its implementation. As most of the on screen real estate is dedicated to the three-dimensional models, simple easy to understand icons will be employed to allow the user to control and manipulate the learning experience. The icons can be configured to allow the user to toggle sounds on and off, toggle between the letter three-dimensional model and the animal three-dimensional model, and so forth.

In one embodiment, a user will be able to select an individual letter to manipulate if multiple educational flash cards are used. The selected letter will be highlighted via a glowing animation. The user can then play the sounds for that letter, toggle to the animal, and so forth.

There are many different ways the education module (171) can be varied without departing from the spirit and scope of embodiments of the invention. By way of example, in one embodiment a user can introduce his own objects into the camera's view and have the three-dimensional object react and interact with the new object. In another embodiment, a user can purchase an add-on card like a pond or food and have the animal interact with the water and eat. In another embodiment, a marker can be printed on a t-shirt and when the user steps in front of the camera, they are transformed into a gorilla. These examples are illustrative only and are not intended to be limiting. Others will be obvious to those of ordinary skill in the art having the benefit of this disclosure.

Turning now to FIGS. 5-24, illustrated therein is an educational system executing various steps of a computer-implemented method of teaching in accordance with one or more embodiments of the invention in one or more illustrative use cases. For simplicity of discussion, the system is configured as an augmented reality system for teaching grammar, and the computer-implemented method is configured as a computer-implemented method of teaching grammar. However, it will be clear to those of ordinary skill in the art having the benefit of this disclosure that embodiments of the invention could be adapted to teach things other than grammar. For example, the use cases described below could be adapted to teach arithmetic, mathematics, or foreign languages. Additionally, the use cases described below could also be adapted to teach substantive subjects such as anatomy, architecture, chemistry, biology, or other subjects.

Figure 5:
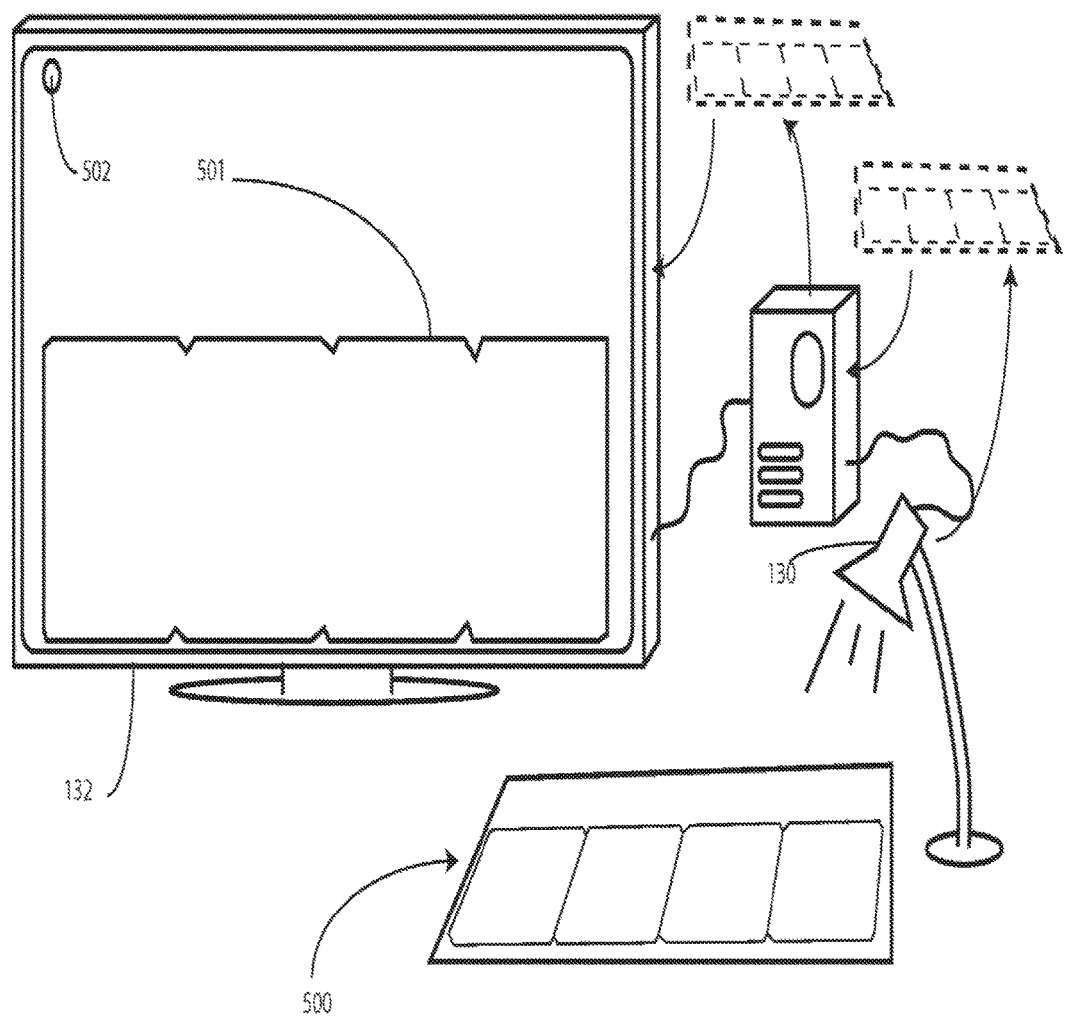
FIGS. 5-25 illustrate features and use cases for systems configured in accordance with one or more embodiments of the invention.

Beginning with FIG. 5, an outline mat 500 has been placed on a work surface, such as a desk. The outline mat 500 has been placed in view of the camera 130, which is coupled to the device 100 running the education module (171). An image 501 of the outline mat 500 appears on the display 132. The outline mat 500, which is an optional accessory, provides a convenient card delimiter that shows a user where educational flash cards (150) should be placed so as to be easily viewed by the camera 130. The education module (171) is configured, in this illustrative embodiment, to present indicator 502 of whether the education module (171) is active. In FIG. 5, the indicator 502 is a dot that is green when the education module (171) is active, and red when the education module (171) is inactive.

Note that "active" can refer to any number of features associated with the education module (171). One illustrative example of such a feature is the generation of audible sound. In one or more embodiments, it will be clear from viewing the display 132 that the education module (171) is active. For instance, if an avatar is sitting atop an image of an educational flash card, it will be clear that the avatar has been added by the active education module (171). Accordingly, the indicator 502 can be used for a sub-feature, such as when the audio capability is active. Illustrating by way of example, when the indicator 502 is green, it may indicate that no audio is being generated. However, when the indicator 502 is red, it may indicate that the education module (171) is producing audio as will be described with reference to FIGS. 8 and 9.

Figure 6:
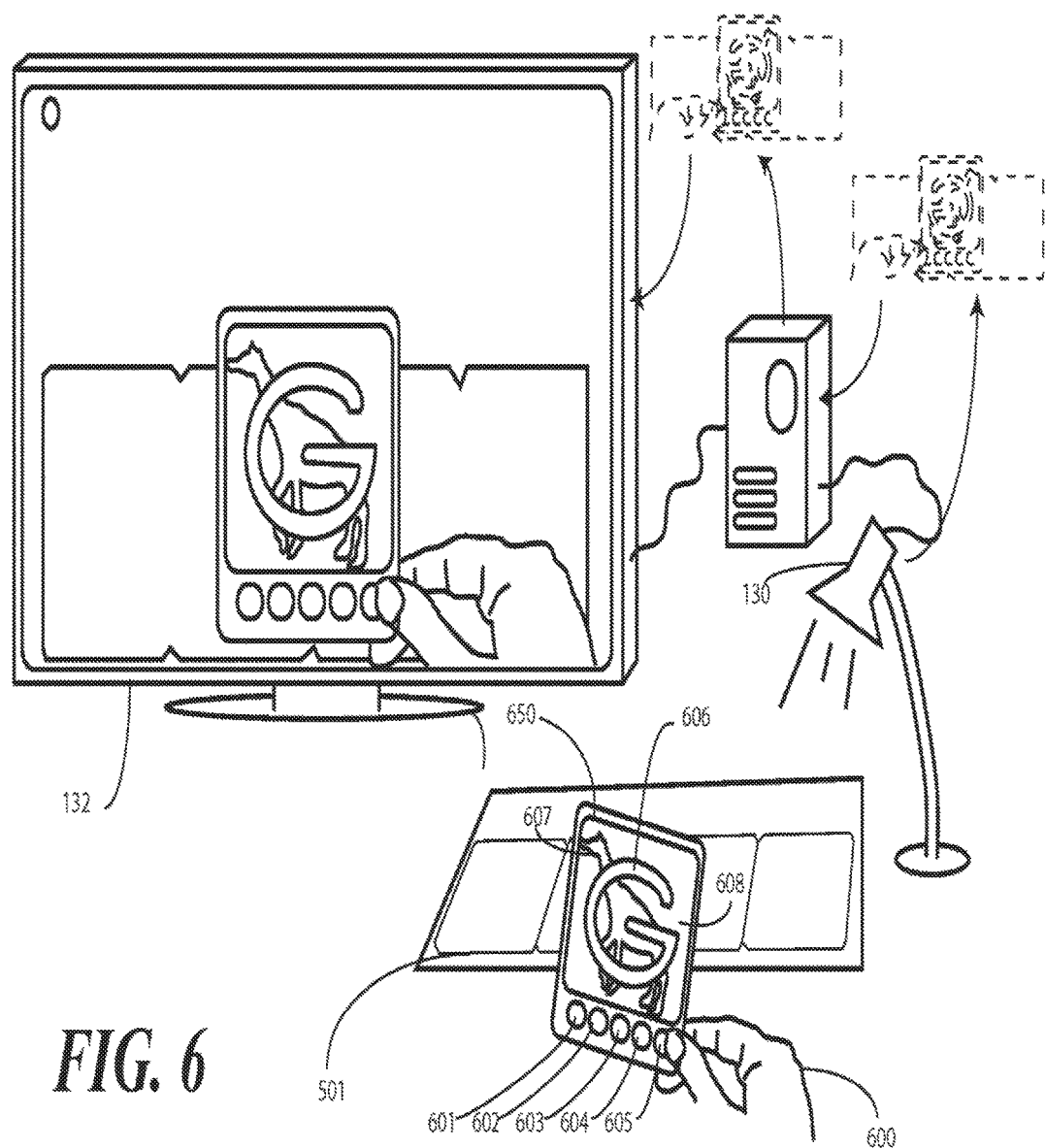

Turning to FIG. 6, a user 600 places an educational flash card 650 down within the card delimiter 501. In this illustrative embodiment, the educational flash card 650 comprises a series of user actuation targets 601, 602, 603, 604, 605 disposed atop the card. Additionally, a grammatical character, which is a letter 606 in this illustrative embodiment, and more specifically in this case is the letter "G," is also disposed upon the educational flash card 650. Other optional information can be presented on the card as well, including a silhouetted animal 607 that has a common first letter with the letter 606 on the card and an image of the animal's habitat 608. It will be clear to those of ordinary skill in the art having the benefit of this disclosure that the information presented on the card can comprise different images, letters, and colors, and that the educational flash card 650 of FIG. 6 is illustrative only.

The user actuation targets 601, 602, 603, 604, 605 are configured as printed icons that are recognizable by the camera 130 and identifiable by the education module (171). When the user actuation targets 601, 602, 603, 604, 605 are visible to the camera 130, the education module (171) is configured not to react to any of these targets. However, when one or more of the user actuation targets 601, 602, 603, 604, 605 becomes hidden, such as when a user's finger is placed atop one of the targets and covers that target, the education module (171) is configured in one embodiment to actuate a multimedia response. The multimedia response can take a number for forms, as the subsequent discussion will illustrate.

In the illustrative embodiment of FIG. 6, the user actuation targets 601, 602, 603, 604, 605 are configured as follows: User actuation target 601 is configured to cause the education module (171), when a three-dimensional avatar of the animal represented by the silhouetted animal 607 is present on the display 132, to toggle between the presentation of the three-dimensional avatar and a three-dimensional representation of the letter 606. User actuation target 602 is configured, when the three-dimensional representation of the letter 606 is present on the display 132, to cause the education module (171) to toggle between an upper case and lower-case three-dimensional representation of the letter 606. User actuation target 603 is configured to cause the education module (171) to play a voice recording stating the name of the animal represented by the silhouetted animal 607 when the three-dimensional avatar of the animal represented by the silhouetted animal 607 is present on the display. User actuation target 604 is configured to cause the education module (171) to play a recording of the sound made by the animal represented by the silhouetted animal 607 to be played by the system. User actuation target 605 is configured to cause the education module (171) to play an auxiliary sound effect. The operation of these user actuation targets 601, 602, 603, 604, 605 will become more apparent in the discussion of the figures that follow.

Figure 7:
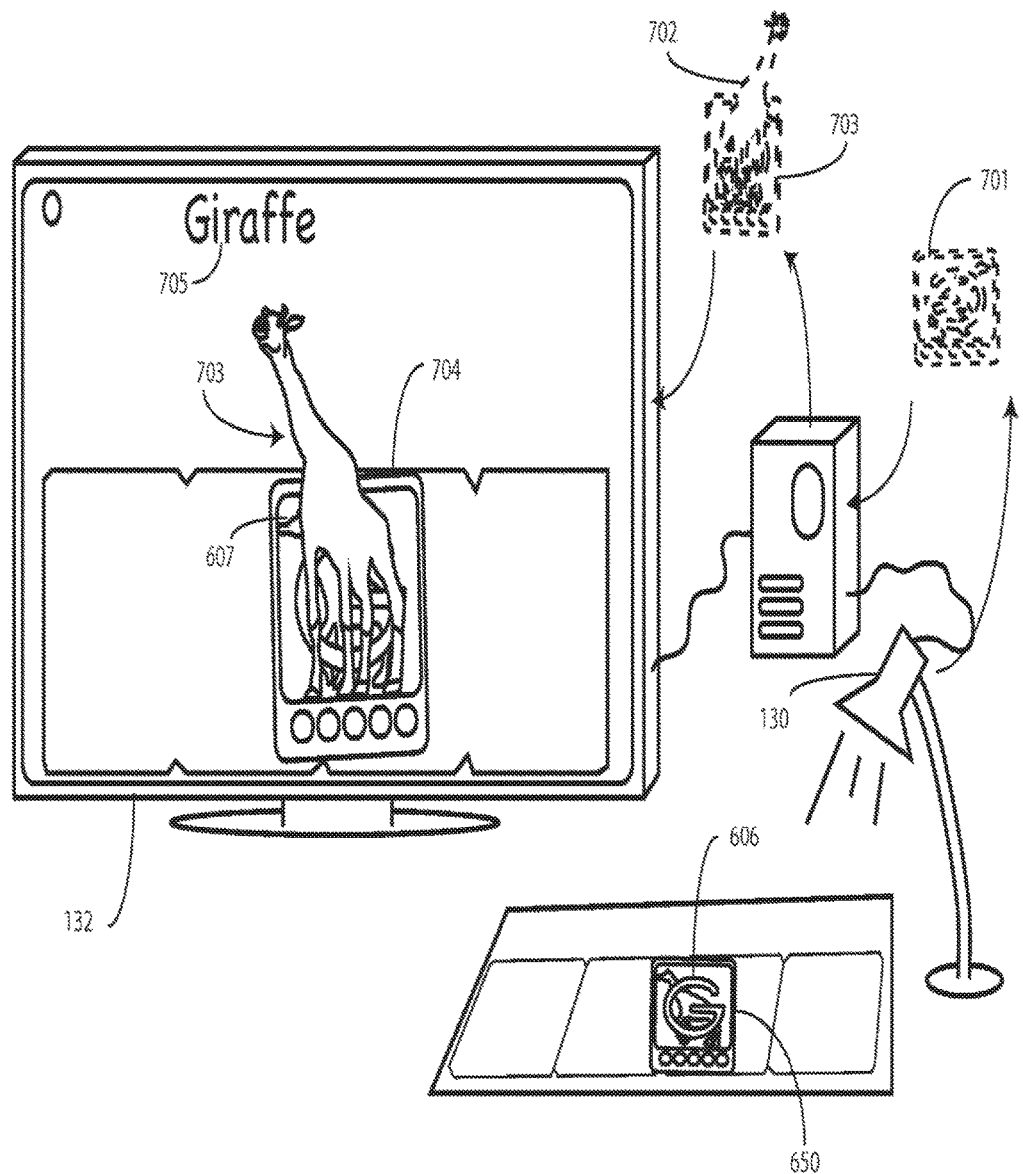

Turning to FIG. 7, once the camera 130 has detected and read the letter 606 on the educational flash card 650, this image data 701 of the educational flash card 750 is delivered to the education module (171) and three-dimensional figure generation program (170). The education module (171) then, in one embodiment, augments the image data 701 by inserting a two-dimensional representation of an educational three-dimensional object 702 into the image data 701 to create augmented image data 703. This causes, in one embodiment, a three-dimensional modeled avatar 703 of an animal corresponding to the silhouetted animal 607 to be presented on display 132. In this illustrative embodiment, the avatar 703 is a giraffe named "Gertie."

The avatar 703 of the animal can be made to move as well. The education module (171) can be configured to animate the animal, such as when the animal appears for presentation on the display 132. For example, in one embodiment, Gertie will look from side to side and sniff the air while moving in her default state. It will be clear to those of ordinary skill in the art having the benefit of this disclosure that the avatars presented on the card can comprise different images, animals, and objects, and that the animal of FIG. 7 is illustrative only.

In the illustrative embodiment shown in FIG. 7, the animal is configured to be very realistic. In one embodiment, the education module (171) can be configured to cause the animal to move and rotate when the user (600) slightly moves or rotates the educational flash card 650. Further, the education module (171) can be configured to tilt the animal when user (600) tilts the educational flash card 650, by an amount corresponding to the tilt of the card. As noted above, this motion works to expand the interactive learning environment provided by embodiments of the present invention.

As shown in FIG. 7, Gertie is standing on the image 704 of the educational flash card 650 on the display 132. In one embodiment, the education module (171) is configured to additionally augmenting the image data 701 by presenting a name 705 of the animal in the augmented image data 703. In this case, the avatar 703 has a name beginning with the letter 606, so the word "Giraffe" appears above Gertie. This is an optional feature that allows students and other users placing the educational flash card 650 before the camera 130 to see the name associated with the animal at the same time the animal appears.

As noted above, in one embodiment the education module (171) can be configured to generate electronic signals that are representative of an audible sounds suitable for emission from a loudspeaker or other electro-acoustic transducer. Said differently, the education module (171) can be configured to play sound effects. For example, in one embodiment, the education module (171) can be configured to cause the animal to make an indigenous sound when the animal appears for presentation on the display 132. In the case of Gertie, she may grunt. In another embodiment, the education module (171) can be configured to generate signals having information corresponding to an audible sound comprising a pronunciation of the name of the avatar 703. In the case of Gertie, the education module (171) may say, "Giraffe," or "This is a giraffe."

Figure 8:
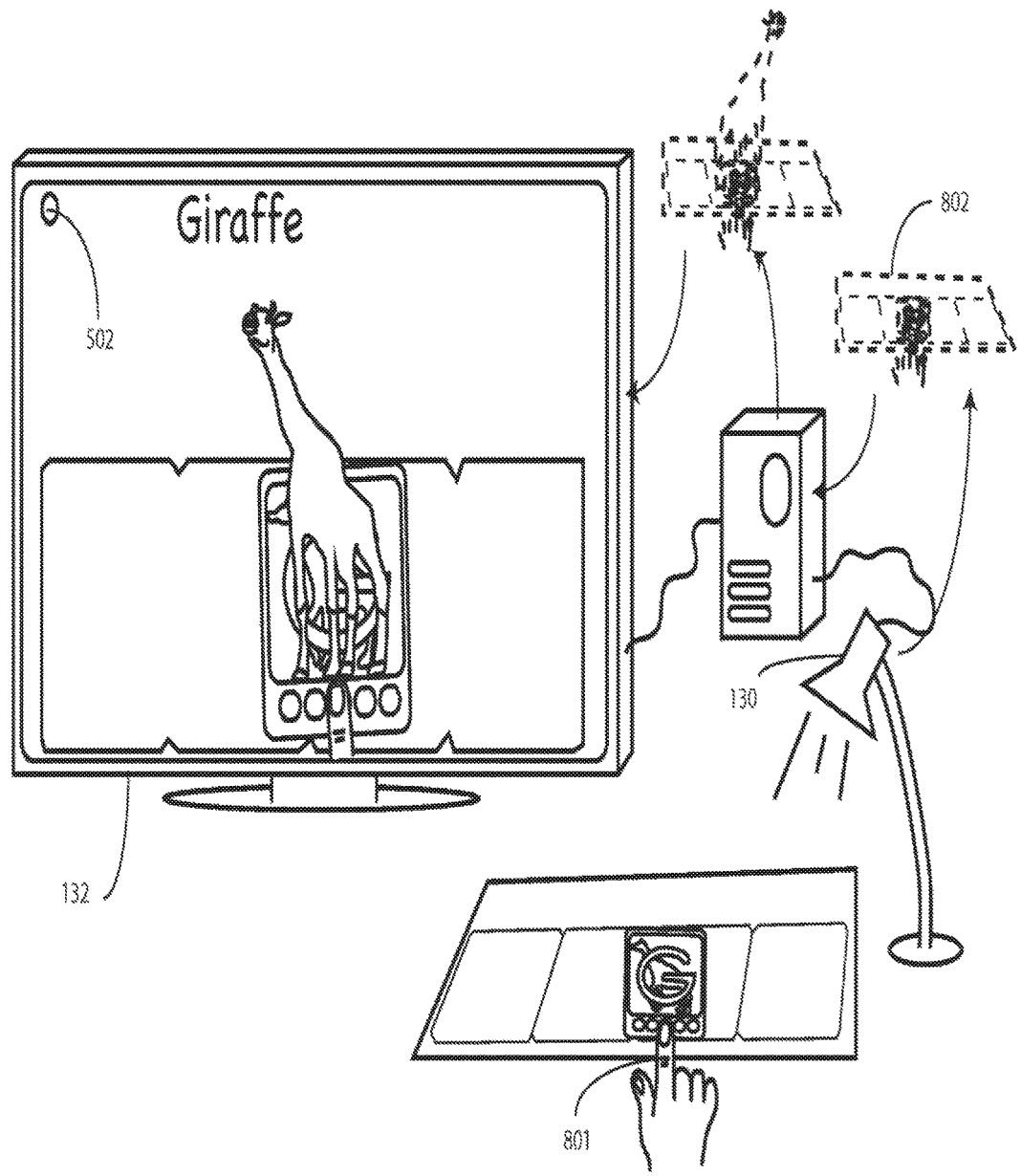
Figure 9:
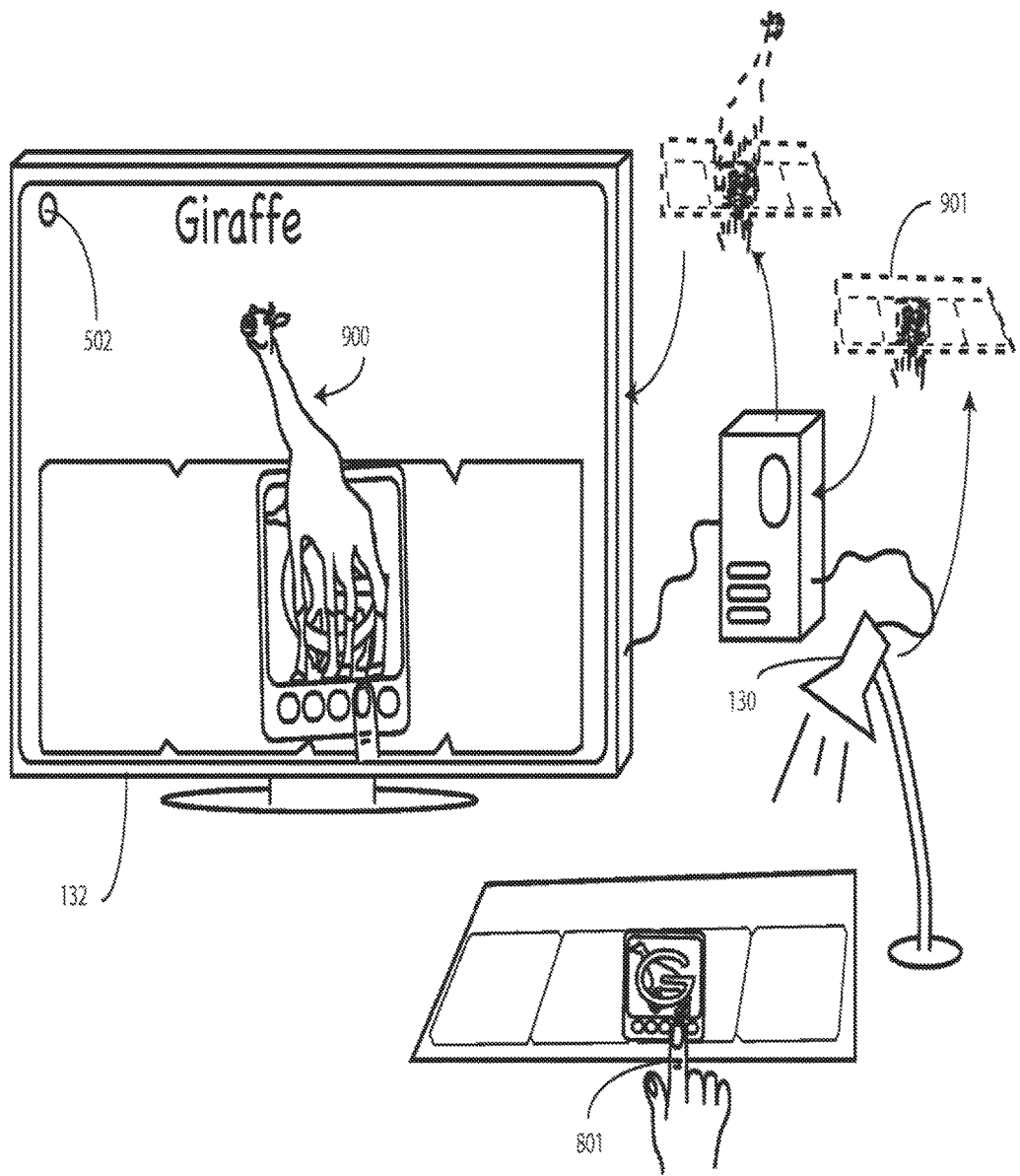

Turning now to FIGS. 8-9, a few examples of audible effects will be illustrated. Beginning with FIG. 8, the user has placed his finger 801 atop the center user actuation target (603). In one embodiment, the education module (171) is configured to detect that an object, i.e., the finger 801, is on the actuation target. When this occurs, the education module (171) generates a signal representative of an audible pronunciation of a name of the animal present on the display 132. The camera 130 has delivered image data 802 to the education module (171), and the education module (171) has detected that the finger 801 is atop the center user actuation target (603). This detection causes the word "Giraffe" to be spoken. In this illustrative embodiment, the fact that audio is active can be determined by the indicator 502 in the upper left hand corner of the display 132. While green in FIG. 7, the indicator 502 has become red, thereby indicating that audio is active.

Turning now to FIG. 9, the user has moved his finger 801 to the fourth user actuation target (604). The camera 130 captures image data 901 showing that the user actuation target (604) is no longer visible. In one embodiment, when this occurs, the education module (171) is configured to detect that the finger 801 is on the actuation target and to generate signals comprising information of an audible sound corresponding to the educational three-dimensional object present on the display 132. In FIG. 9, the education module (171) can cause the animal, i.e., Gertie 900, to make an indigenous sound. For example, Gertie 900 may grunt. The education module (171) may also animate Gertie 900 to move when she grunts as giraffes do naturally. For instance, she may slightly shake her head side to side or up and down. As with FIG. 8, the indicator 502 in the upper left hand corner of the display has become red, thereby indicating that audio is active.

Figure 10:
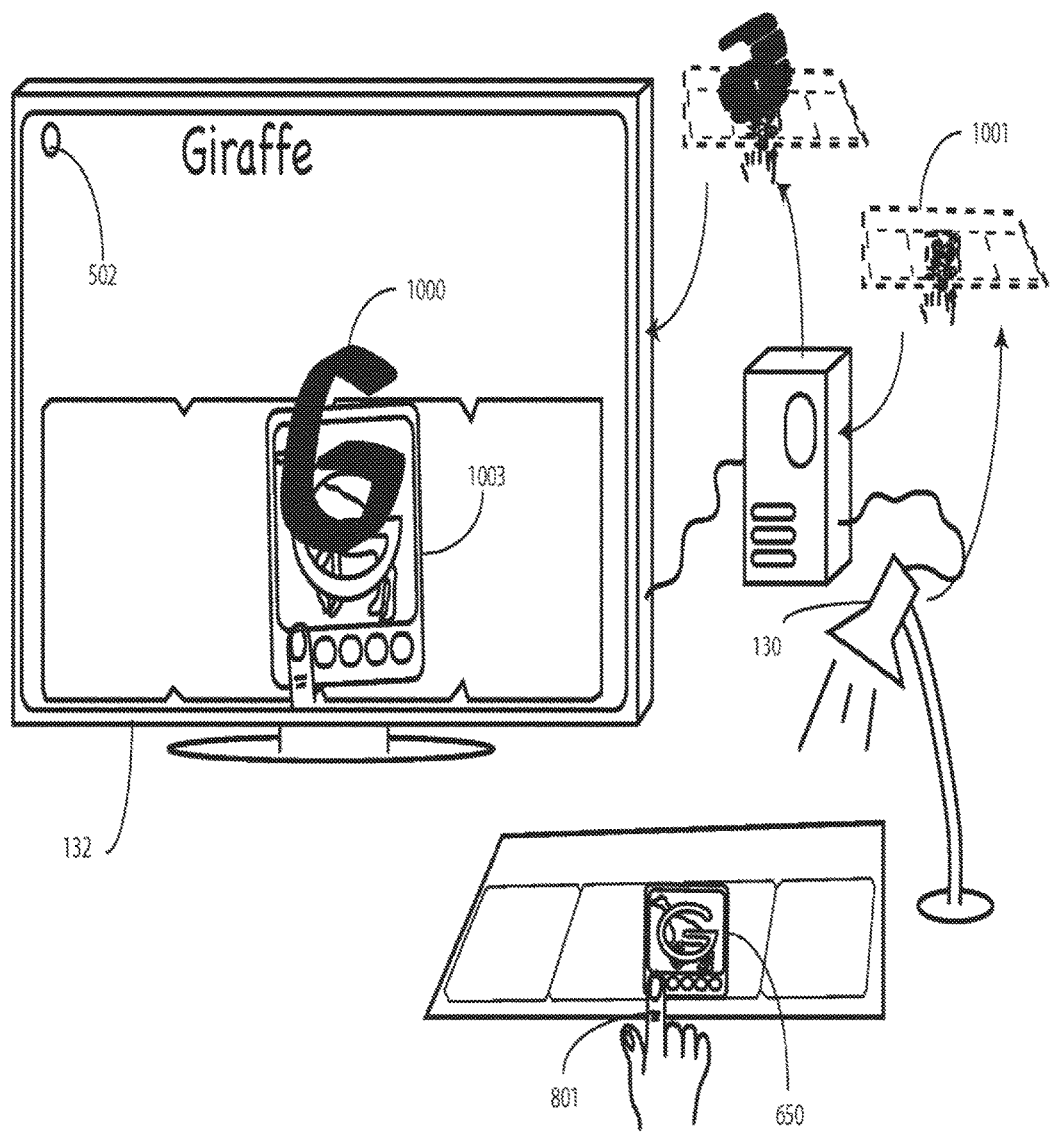

Turning now to FIG. 10, the user has moved his finger 801 to the first user actuation target (601). The camera 130 captures image data 1001 showing that the user actuation target (601) is no longer visible. In one embodiment, when this occurs, the education module (171) is configured to cause the avatar (703) to transform to a two-dimensional representation of a three-dimensional letter 1000. In the illustrative embodiment of FIG. 10, the three-dimensional letter 1000 is the first letter of a name of Gertie (900), i.e., the letter "G." In this embodiment, a large white "G" is shown sitting atop an image 1003 of the educational flash card 650. The "G" is shown as a fun, whimsical looking, capital letter.

Figure 11:
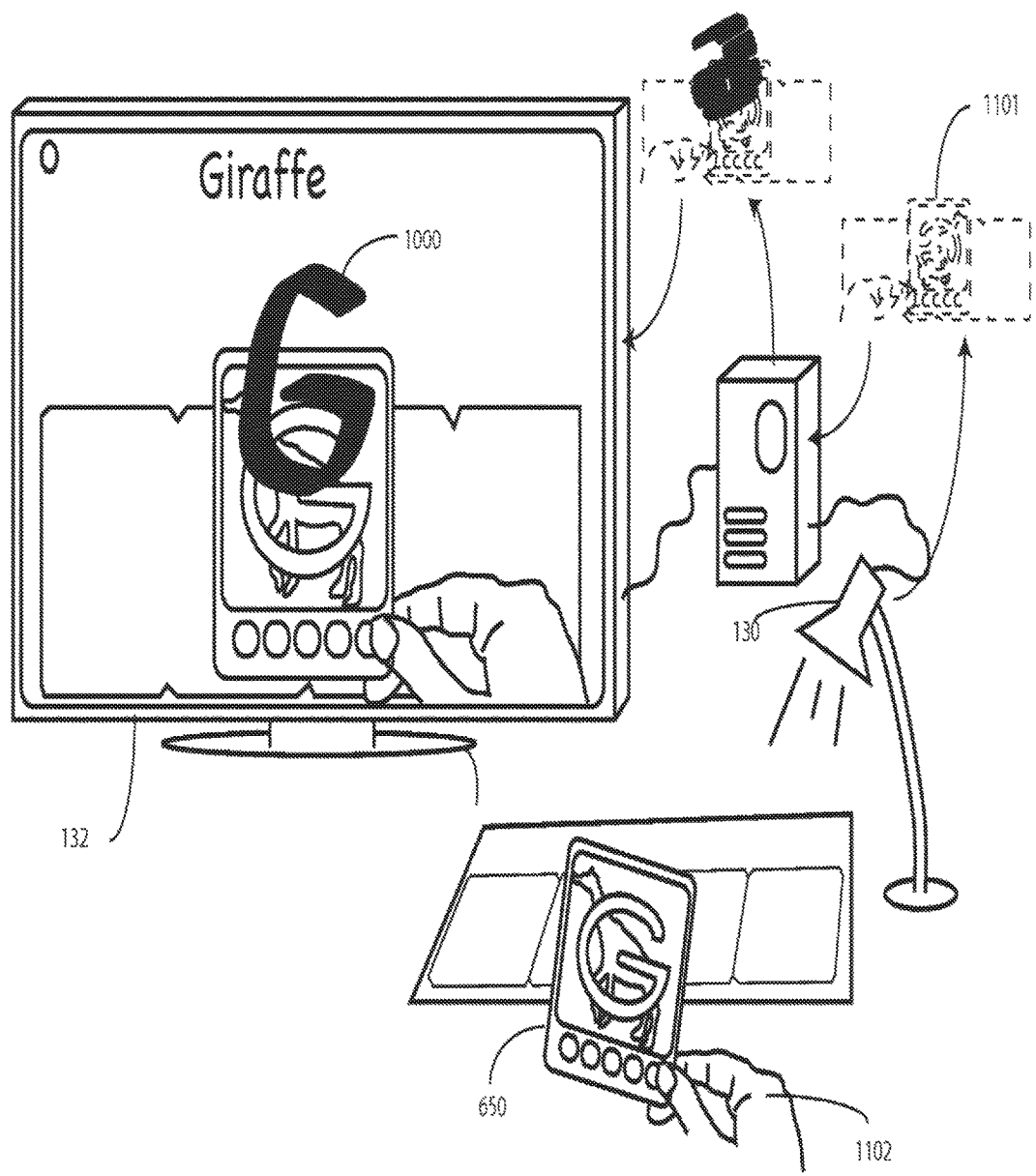

As shown in FIG. 11, in one embodiment, the education module (171) can be configured to detect movement of the educational flash card 650 present in the image data 1101 and to cause the educational three-dimensional object, which is in this case still the "G" 1000, to move on the display 132 in a corresponding manner. For example, the education module (171) is configured to cause the letter 1000 to rotate when the user 1102 rotates the educational flash card 650. Further, the education module (171) can be configured to tilt the letter when the educational flash card 650 is tilted in a corresponding amount. This motion works to expand the interactive learning environment provided by embodiments of the present invention.

Figure 12:
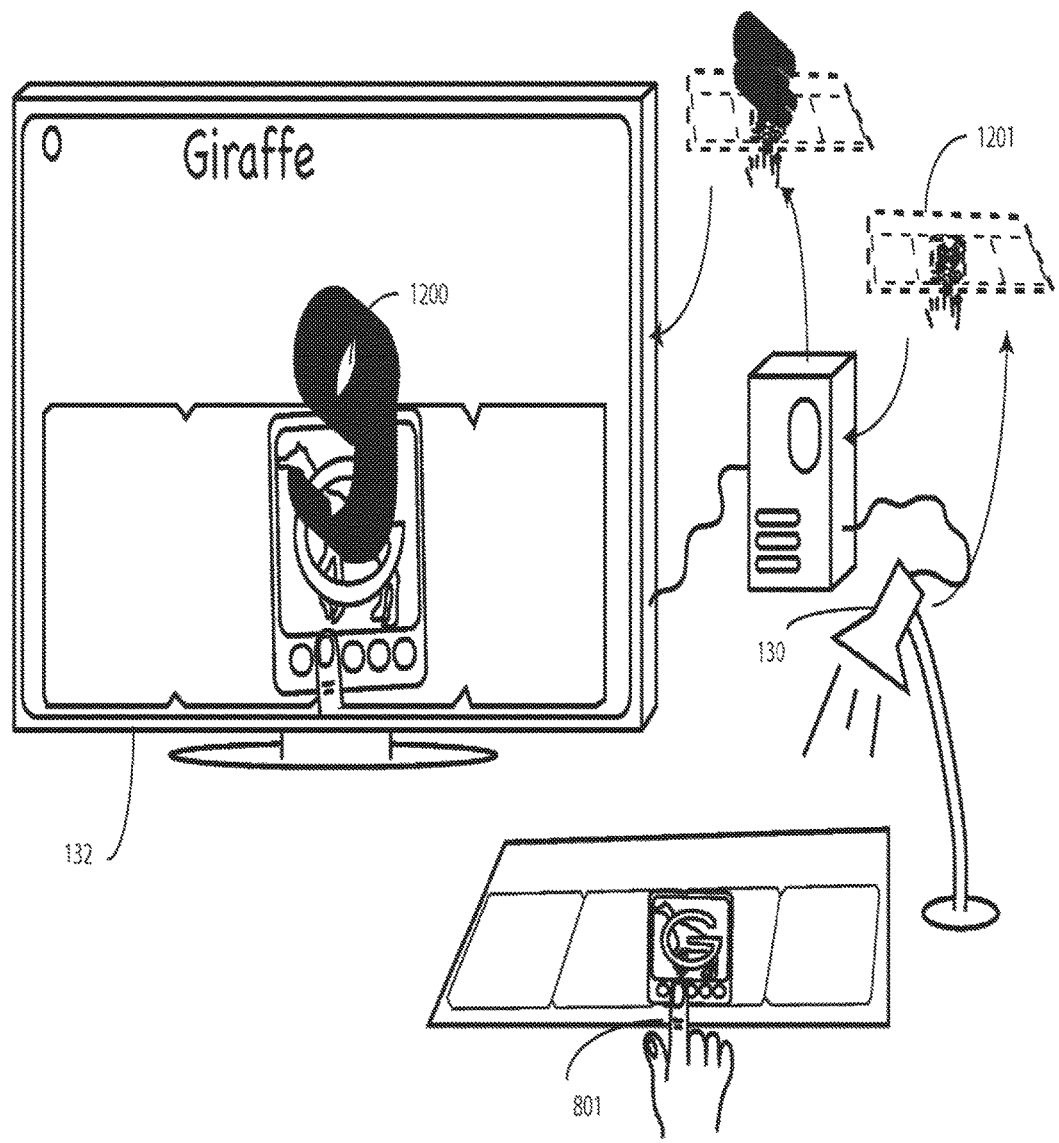

Turning now to FIG. 12, the user has moved his finger 801 to the second user actuation target (602). The camera 130 captures image data 1201 showing that the user actuation target (602) is no longer visible. In one embodiment, when this occurs, the education module (171) is configured to cause the three-dimensional embodiment to transition between one of upper case to lower case, or lower case to upper case. Here, since the "G" (1000) was upper case (or capitalized) in FIG. 10, placement of the finger 801 on the second user actuation target (602) causes the "G" (1000) to transition to a "g" 1200 on the display 132. In one embodiment, the education module (171) is configured to detect additional objects on the second user actuation target (602) and to cause another transition of the three-dimensional embodiment between one of lower case to upper case or upper case to lower case. In this illustrative embodiment, if the user were to remove his finger 801 from the second user actuation target (602) and then recover it, the "g" 1200 would transition back to a "G" (1000).

Figure 13:
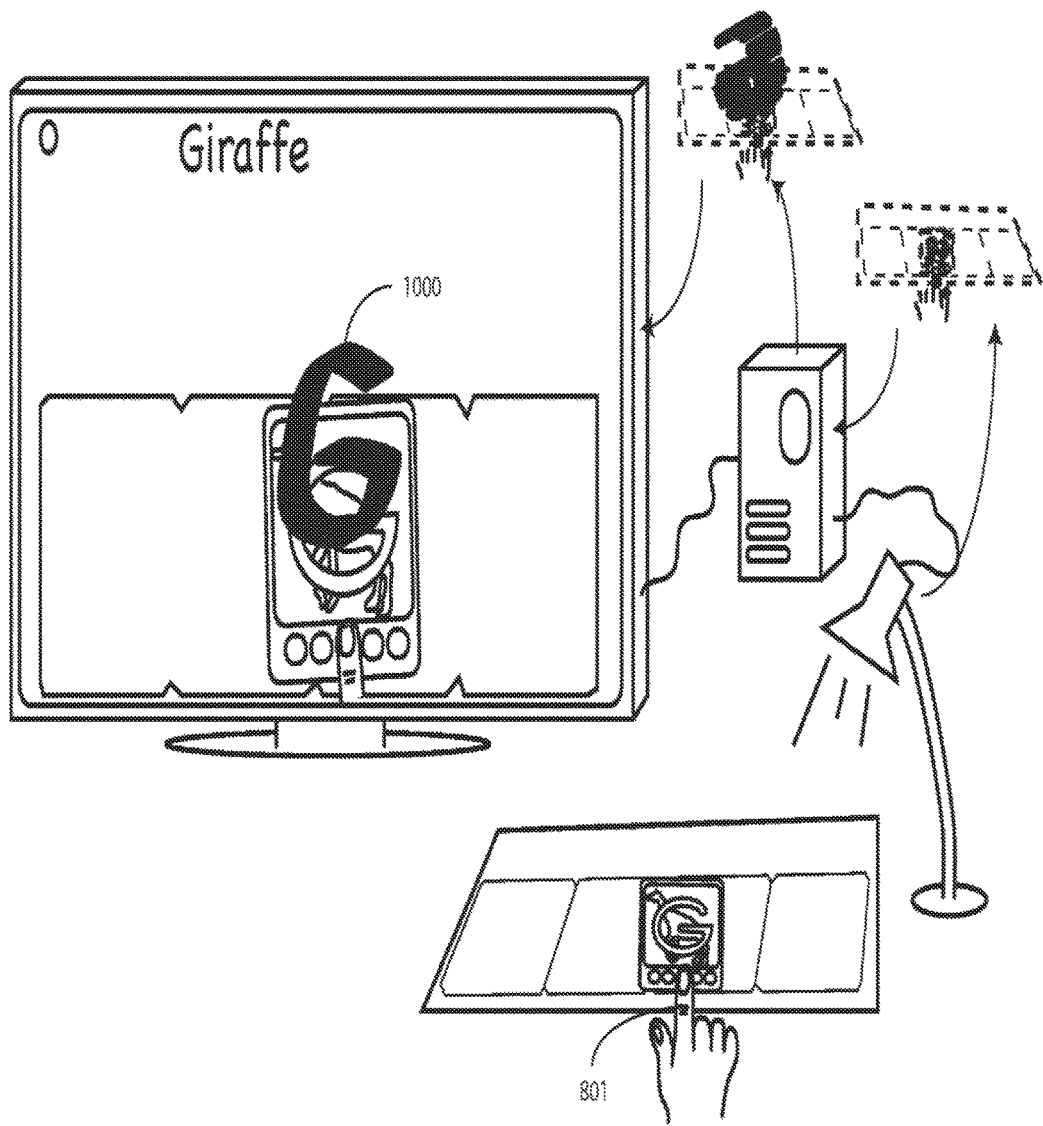

Turning now to FIG. 13, the user has placed his finger 801 atop the center user actuation target (603) while the three-dimensional molded letter "G" 1000 is present. In this scenario, in one embodiment, the education module (171) causes the name of the letter to be spoken. In FIG. 13, the education module (171) generates signals for the system to say "gee."

Figure 14:
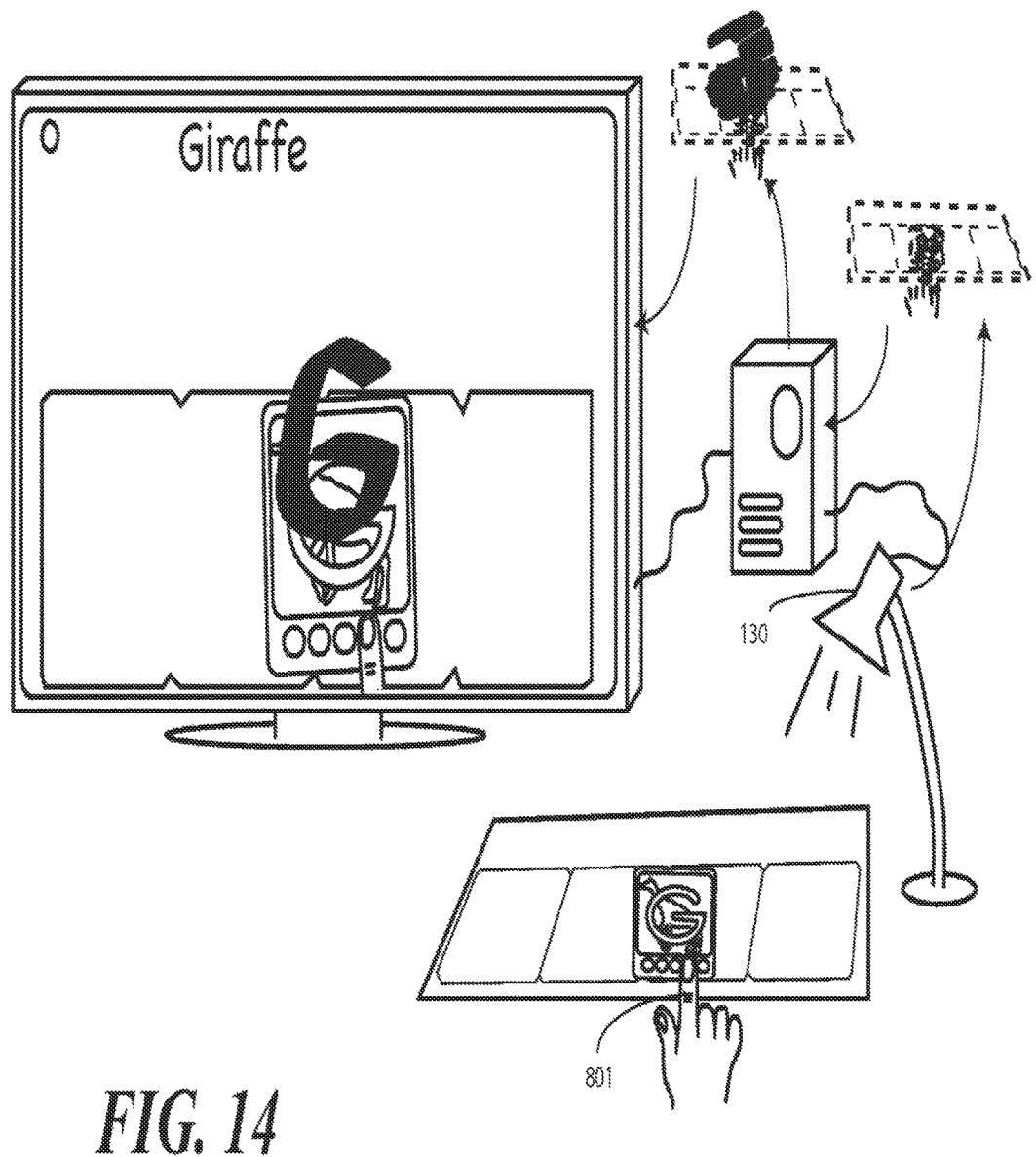

Turning now to FIG. 14, the user has moved his finger 801 to the fourth user actuation target (604) while the "G" is present. The camera 130 captures this. In one embodiment, the education module (171) is configured to generate a signal representative of an audible pronunciation of a hard phonetic sound of the letter. In this illustrative embodiment, the fourth user actuation target (604) corresponds to the soft sound of the letter. Accordingly, the education module (171) says "guh."

Figure 15:
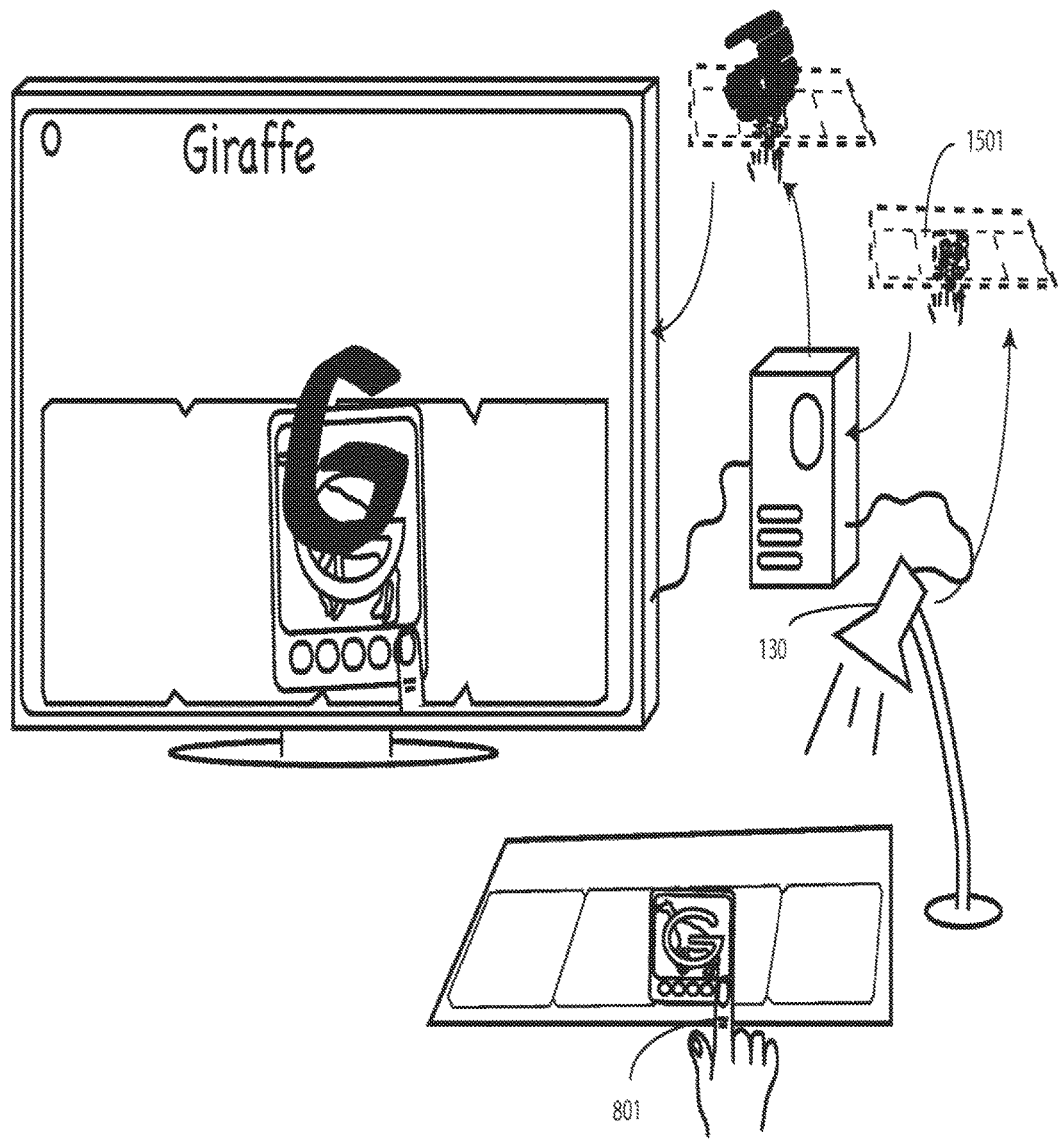

Turning now to FIG. 15, the user has moved his finger 801 to the fifth user actuation target (605) while the "G" is present. The camera 130 captures image data 1501 showing the finger 801 atop the fifth user actuation target (605). The education module (171) employs the image data 1501 to determine that the fifth user actuation target (605) is no longer visible. In one embodiment, the education module (171) is configured to generate a signal representative of an audible pronunciation of a soft phonetic sound of the letter. In this illustrative embodiment, the fifth user actuation target (605) corresponds to the soft sound of the letter. Accordingly, the education module (171) says "juh."

In addition to teaching the alphabet, embodiments of the invention can be used to teach students composition, sentence structure, and even zoology as well. For example, rather than making the visible object on the educational flash cards a letter, the visual objects on some of the cards can be words. As will be shown in the figures below, the education module (171) can be configured to recognize educational flash cards having special markers (152) configured as words in addition to letters. Further, groups of these cards can be identified to teach students to form questions and sentences. The education module (171) can then be equipped with additional features that make learning fun.

Figure 16:
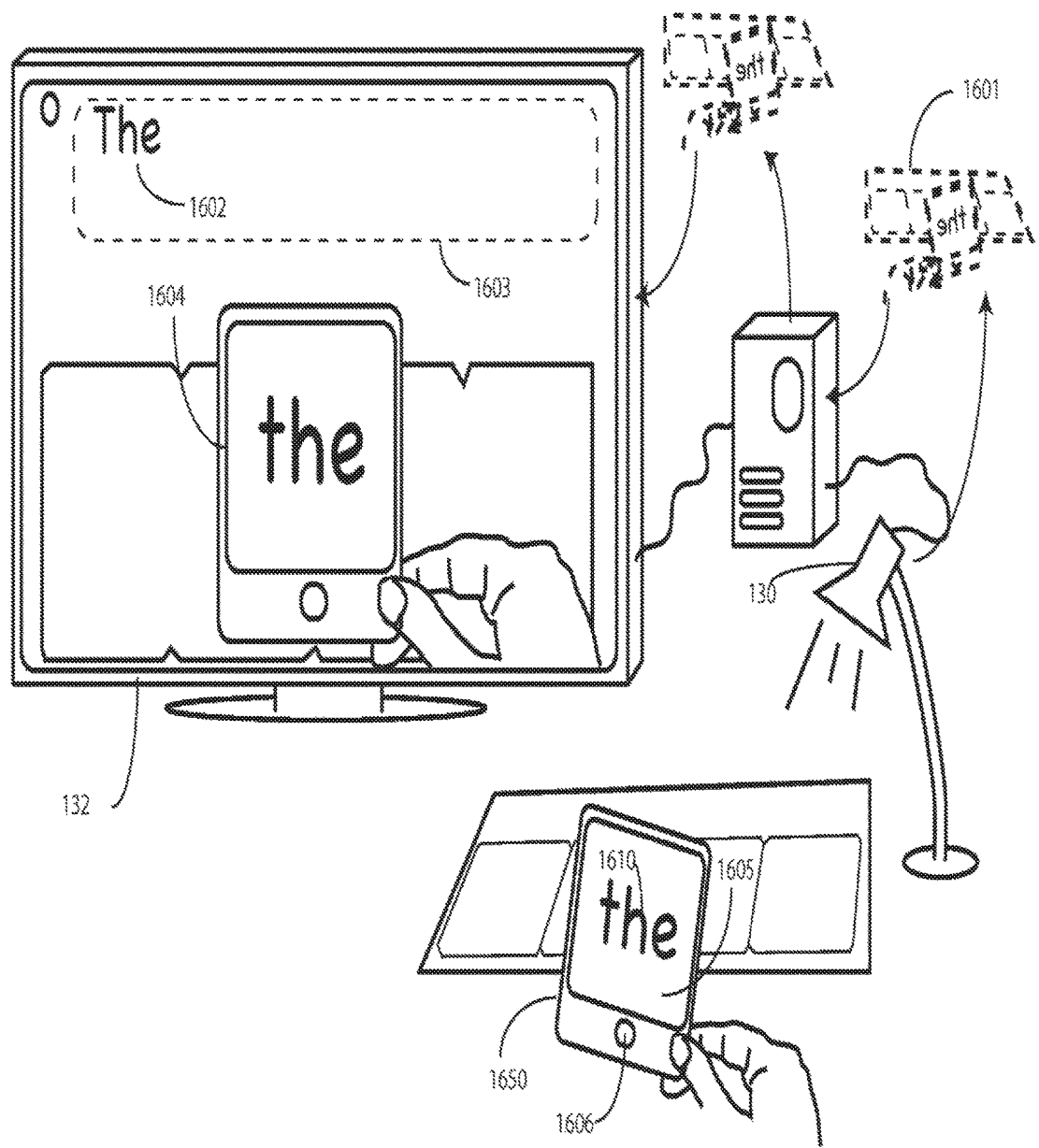

In one embodiment, the camera is configured to capture one or more images of at least one educational flash card having at least a word disposed thereon, and to augment the one or more images with an educational module by superimposing a two-dimensional representation of the word in a presentation region of one or more augmented images comprising an image of the at least one educational flash card. Turning now to FIG. 16, an educational flash card 1650 is shown having the word "the" 1610 disposed thereon as a special marker (152). It could have had other articles instead of "the," such as "a" or "an" as well. The camera 130 captures one or more images of the educational flash card 1650 as image data 1601 and delivers this image data 1601 to the education module (171). When the education module (171) has detected and read the word "the" 1610, a corresponding image 1602 of the word is presented on the display 132. In one embodiment, the education module (171) causes the image 1602 to appear on the display 132 in a presentation region 1603 that is away from the image 1604 of the educational flash card 1650.

In one embodiment, the educational flash card 1650 is configured with a blue background 1603 and a serene, scenic picture 1605 disposed beneath the word "the" 1610. In this illustrative embodiment, the "word card" of FIG. 16 includes a single user actuation target 1606. User actuation target 1606 is configured to cause the education module (171) to generate electronic signals to play a voice recording stating of the word presented on the card. Said differently, when the user places a finger atop the single user actuation target 1606, the education module (171) will generate signals causing the system to say "the." It will be clear to those of ordinary skill in the art having the benefit of this disclosure that the information presented on the card can comprise different words and colors, and that the word card of FIG. 16 is illustrative only. By way of example, FIGS. 40-116 each illustrate alternative educational flash cards 4050-11650.

Figure 17:
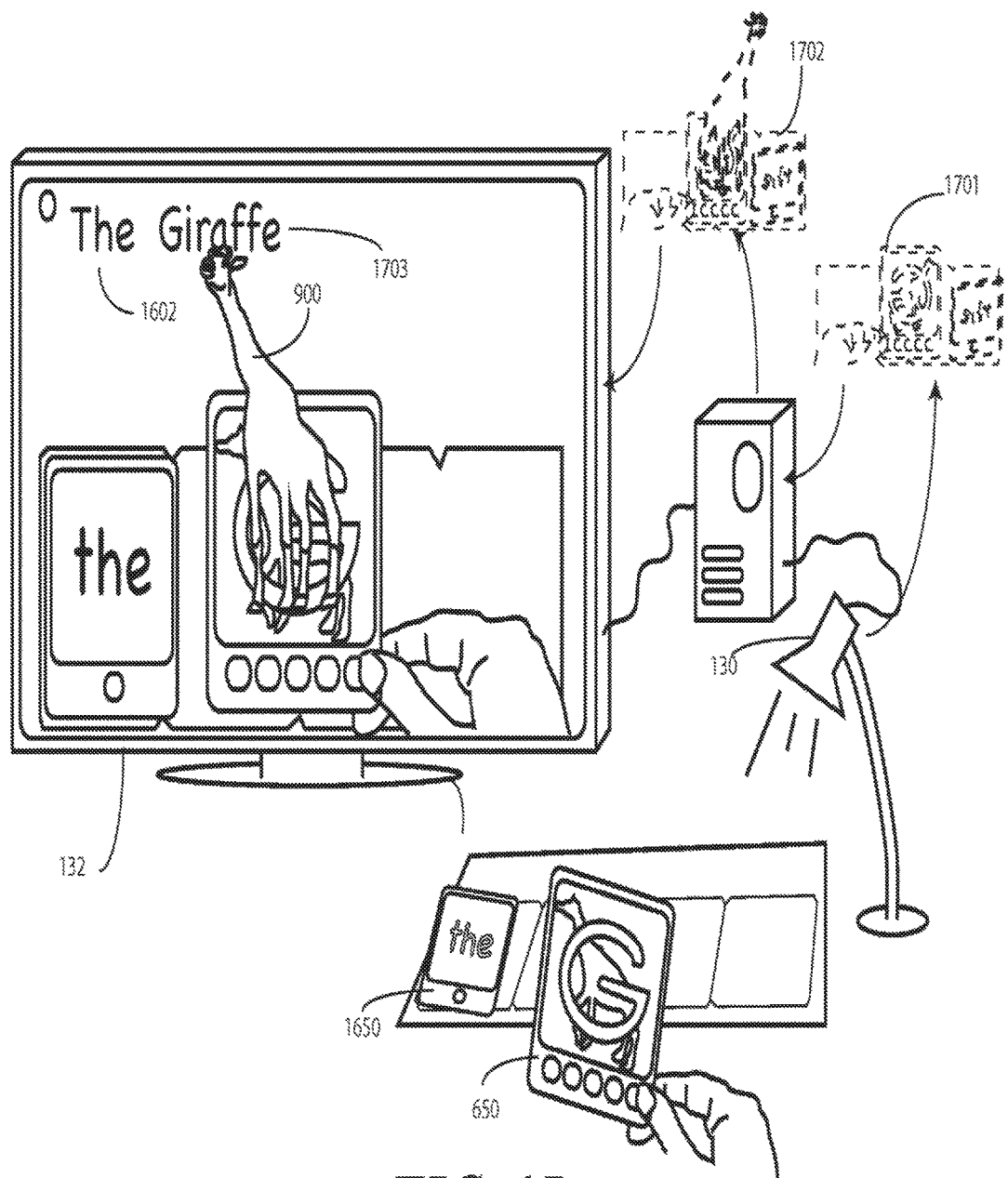

Turning now to FIG. 17, the educational flash card 650 described with reference to FIGS. 8-15 is placed by the educational flash card 1650 of FIG. 16. Educational flash card 650 has a letter disposed thereon, so the education module (171) augments the image data 1701 by superimposing a two-dimensional representation of an educational three-dimensional object corresponding to the letter, i.e., Gertie 900, in the one or more augmented images. At the same time, the education module (171) presents the word "giraffe" 1703 in the presentation region (1603). Accordingly, Gertie 900 appears on the display 132, as does the word "giraffe" 1703. In one embodiment, Gertie 900 will be animated the educational three-dimensional object in accordance with at least one predetermined motion. For instance, when she first appears, she may be animated with an idle motion where she looks slightly to the left and right, as if she were looking out through the display 132 at the user. At other stages, she can be animated in accordance with other motions, such as walking, running, swimming, eating, and so forth. Since educational flash card 1650 is placed to the left of educational flash card 650, the word "giraffe" 1703 appears left of the word "the" 1602. Additionally, since the word "the" 1602 is the first word in the sentence being created with the educational flash cards 1650,650, the education module (171) has automatically capitalized it.

Figure 18:
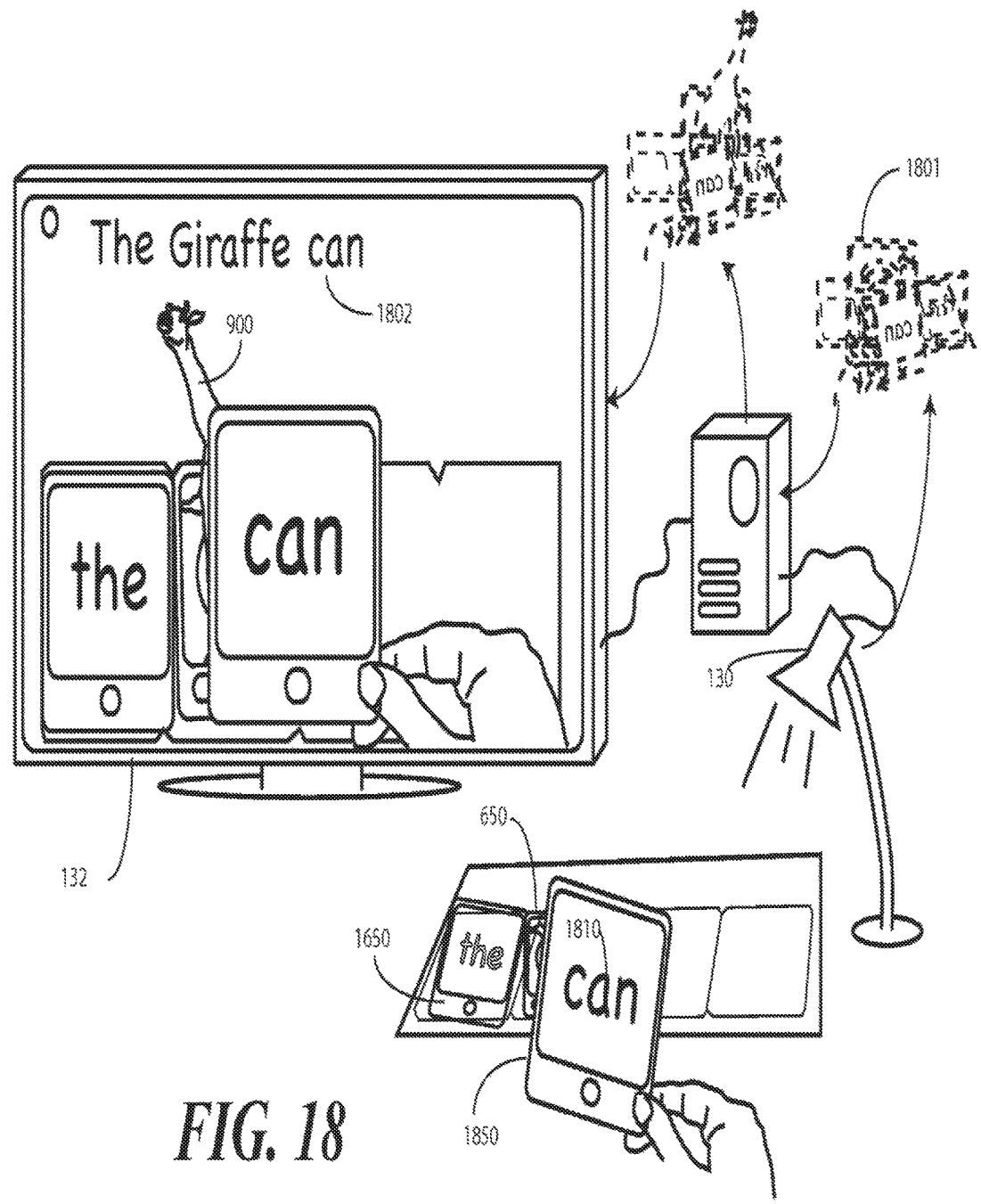

Turning now to FIG. 18, it can now be seen that a sentence is being formed with a plurality of flash cards, each having a different word or letter disposed thereon. In FIG. 18, another educational flash card 1850 having a verb 1810 disposed thereon is added to educational flash cards 1650, 650. In this illustrative embodiment, educational flash card 1850 is shown having the word "can" disposed thereon as a special marker (152). Once the camera 130 has delivered this image data 1801 to the education module (171), the education module (171) causes a visual image of the word "can" 1802 to appear on the display 132. Since the word "can" is the third word in the sentence that is being formed by the educational flash cards 1650,650,1850, the visual image of the word "can" 1802 appears third in the sentence presented in the presentation region (1603) above the educational flash cards 1650, 650, 1850.

A partial sentence has been formed, with Gertie 900 configured as an animated avatar on one of the educational flash card images on the display 132. In one or more embodiments, to make the educational experience more fun and entertaining, the education module (171) can be configured to cause the avatar to answer a question formed by the educational flash cards 1650, 650, 1850. In this illustrative embodiment, the education module (171) can be configured to cause Gertie 900 to answer whether she is capable of accomplishing the verb 1810. However, "can" is a modal verb, and is therefore only part of a fully conjugated verb. Can Gertie 900 what? Another educational flash card is required to complete the sentence. Turning now to FIGS. 19-22, illustrative embodiments of the answering feature will be explained in more detail.

Figure 19:
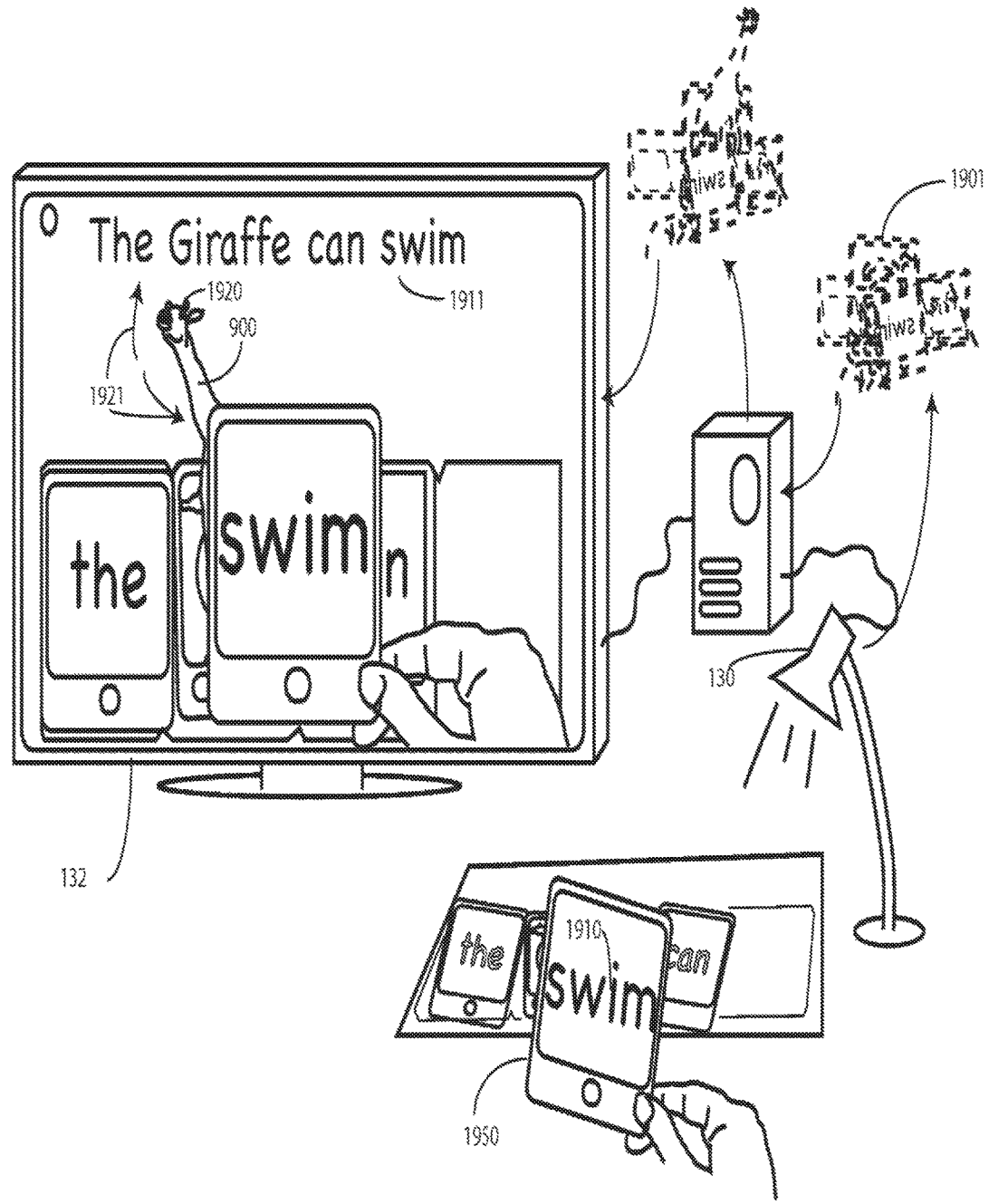

Beginning with FIG. 19, the student has placed a fourth educational flash card 1950 having the word "swim" 1910 disposed thereon as a special marker (152). The camera 130 captures this as image data 1901 and delivers it to the education module (171). When the education module (171) detects and reads the word "swim" 1910, it can configure Gertie 900 to answer the question, demonstrate the answer to the question, or decline to demonstrate the answer to the question.

Here, the education module (171) first causes a visual image of the word "swim" 1911 to appear on the display 132. Since the word "swim" 1910 is the fourth word in the sentence that is being formed by the educational flash cards 1650,650,1850,1950 the visual image of the word "swim" 1911 appears fourth in the sentence above.

It is well to note that giraffes are very good swimmers. Accordingly, since Gertie 900 can indeed swim, in one embodiment the education module (171) is configured to make Gertie 900 confirm or deny the statement presented above her by shaking her head. In this example, Gertie 900 is configured to nod her head 1920 up and down 1921. In so doing, Gertie's simulated movement is responsive to the arrangement of one or more educational flash cards 1650, 650, 1850, 1950 present in the image data 1901. Had the answer been "no," Gertie would have been configured to shake her head 1920 side to side. Other motions of simulated agreement or disagreement will be readily available to those of ordinary skill in the art having the benefit of this disclosure.

Figure 20:
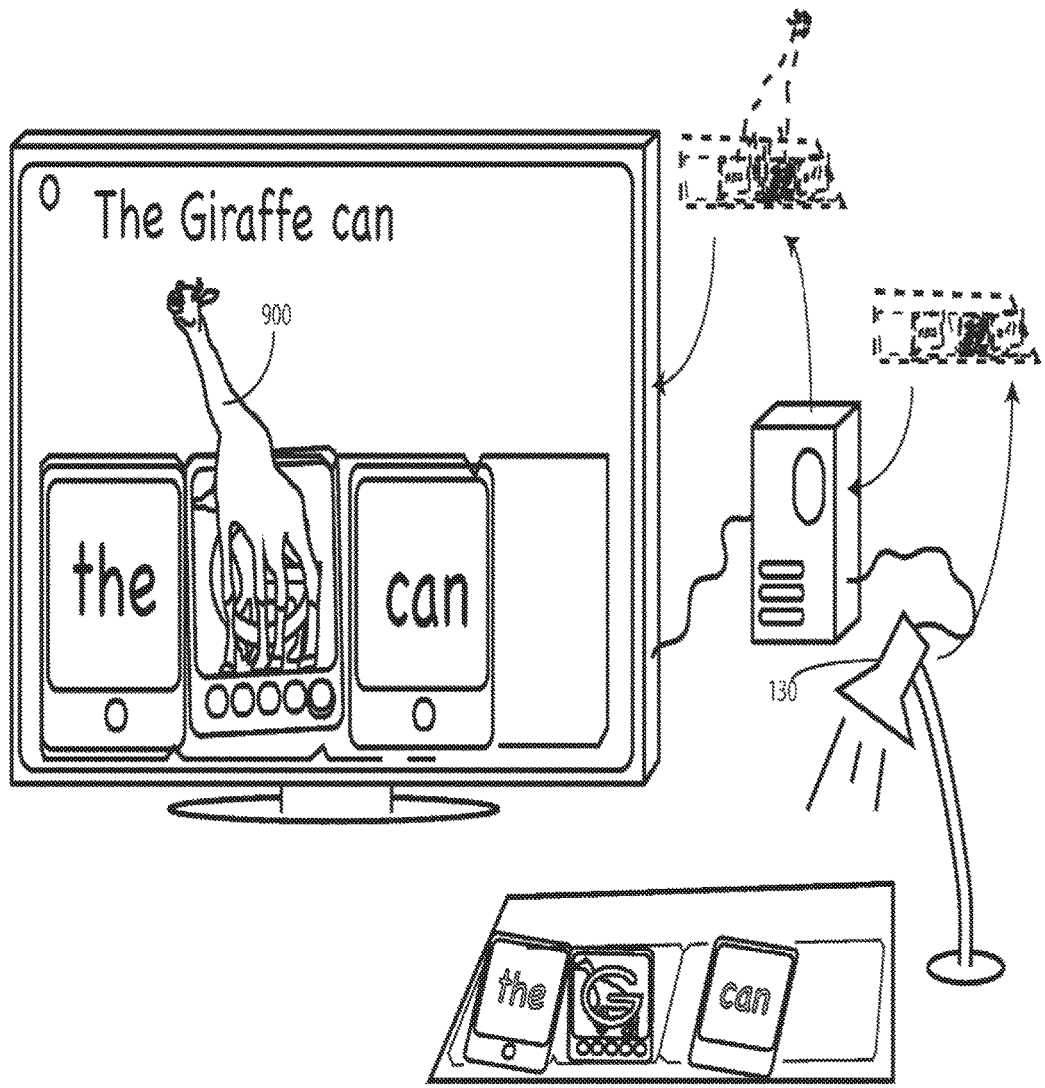

In FIG. 20, the swim card (1950) has been removed. Accordingly, the visual image of the word "swim" (1911) has been removed. Gertie 900 then stops nodding and, in one embodiment, returns to her default animation state.

Figure 21:
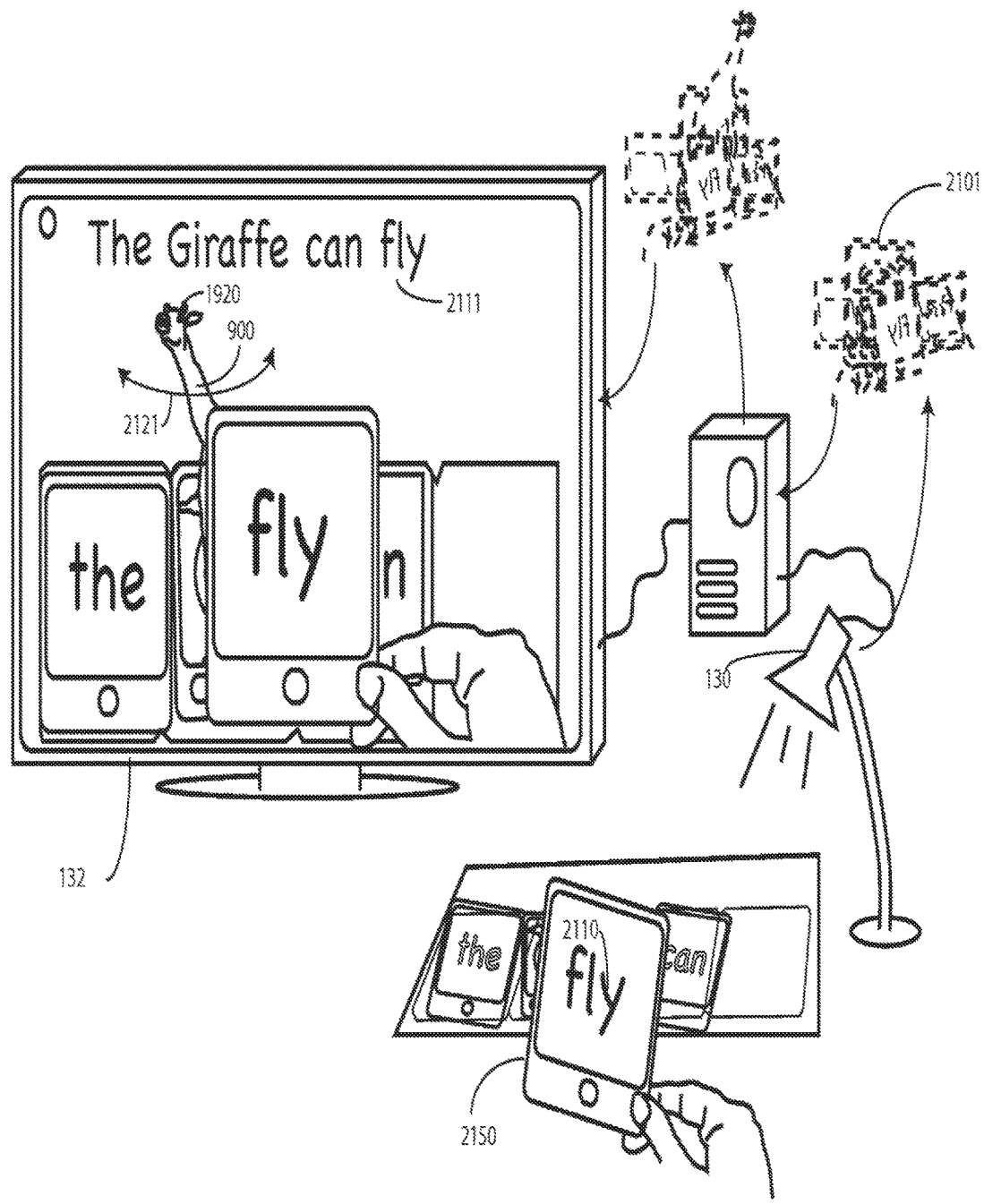

Turning to FIG. 21, the student has placed an educational flash card 2150 having the word "fly" 2110 disposed thereon as a special marker (152). The camera 130 captures this as image data 2101 and delivers it to the education module (171). When the education module (171) detects and reads the word "fly" 2110, it can configure Gertie 900 to answer the question. The education module (171) first causes a visual image of the word "fly" 2111 to appear on the display 132. As with the word "swim" 1910, since the word "fly" 2110 is the fourth word in the sentence that is being formed by the educational flash cards 1650, 650, 1850, 2150 the visual image of the word "fly" 2111 appears fourth in the sentence above. It is obvious to adults that giraffes cannot fly. To teach this concept to younger students, the education module (171) is configured to make Gertie 900 confirm or deny the statement presented above her by shaking her head 1920 left and right 2121 to indicate, "No, I cannot fly."

Figure 22:
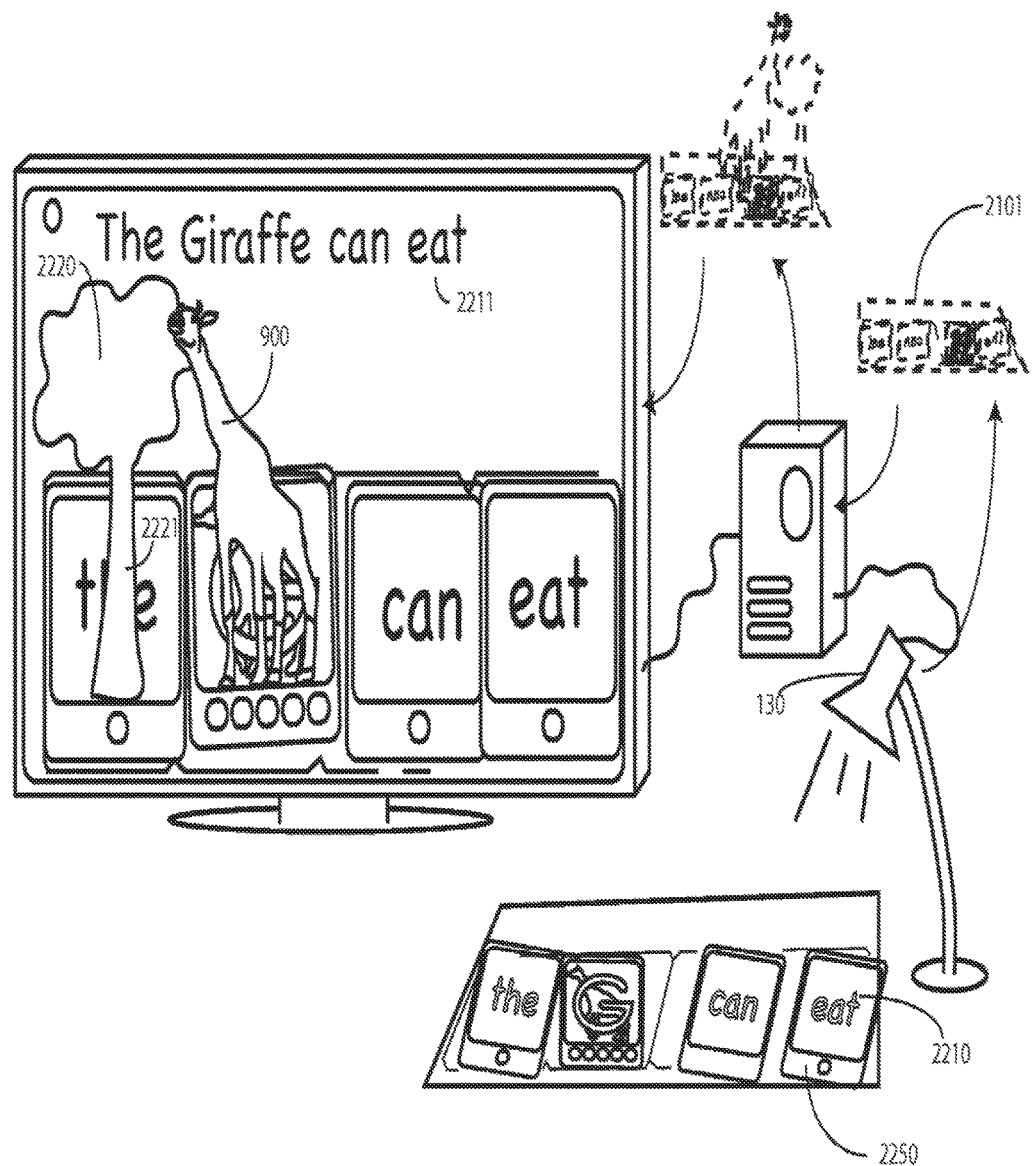
Figure 23:
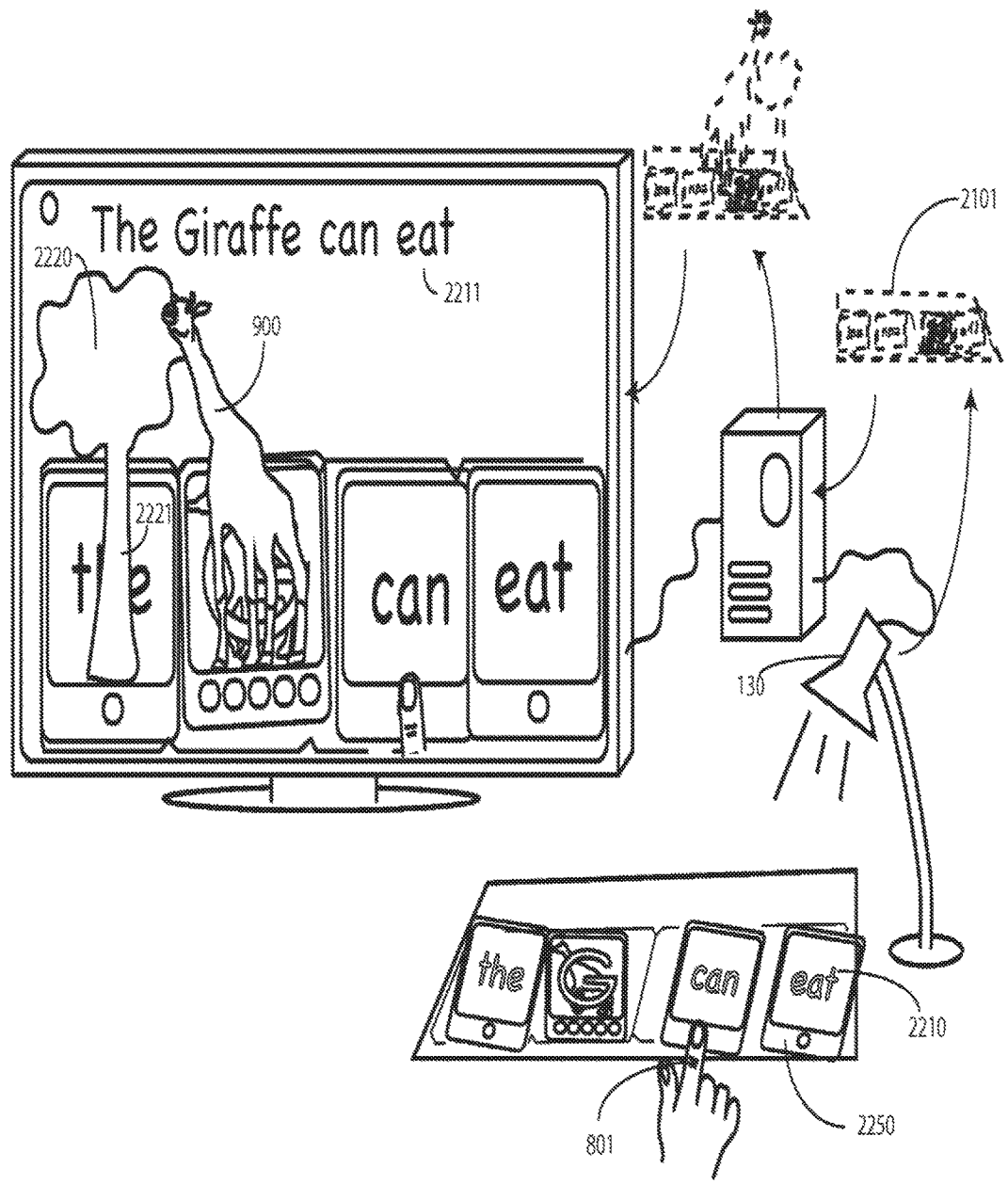

Turning to FIG. 22, the student has placed an educational flash card 2250 having the word "eat" 2210 disposed thereon as a special marker (152). The camera 130 captures this as image data 2101 and delivers it to the education module (171). When the education module (171) detects and reads the word "eat" 2210, the education module (171) causes a visual image of the word "eat" 2211 to appear on the display (132). Of course, giraffes can indeed eat. To teach the student how they eat, in one embodiment the education module (171) is configured to cause Gertie 900 to demonstrate the answer to the question completed by educational flash card 2250. As shown in FIG. 22, Gertie 900 has been shown eating leaves 2220 from a virtual tree 2221. As shown in FIG. 23, a student can move his finger 801 across the user actuation targets of each educational flash card 1650, 650, 1850, 2250 to cause the education module (171) to read the sentence presented above, one word at a time. In FIG. 23, the finger 801 is above the user actuation target on educational flash card 1850, so the education module (171) would be reading the word "can" from the sentence "the" "giraffe" "can" "eat." The student can select words to be read in any order.

Figure 24:
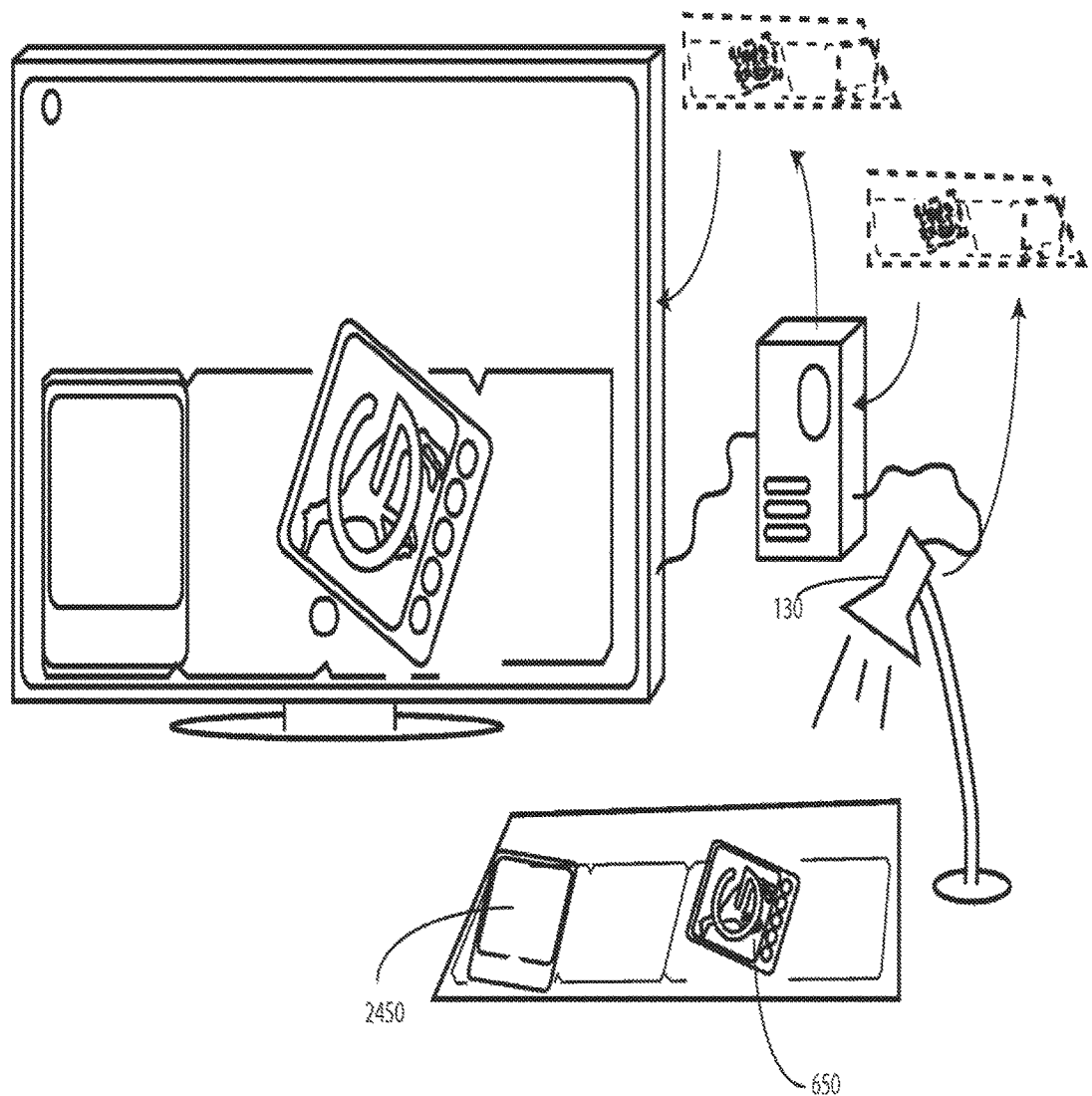
Figure 25:
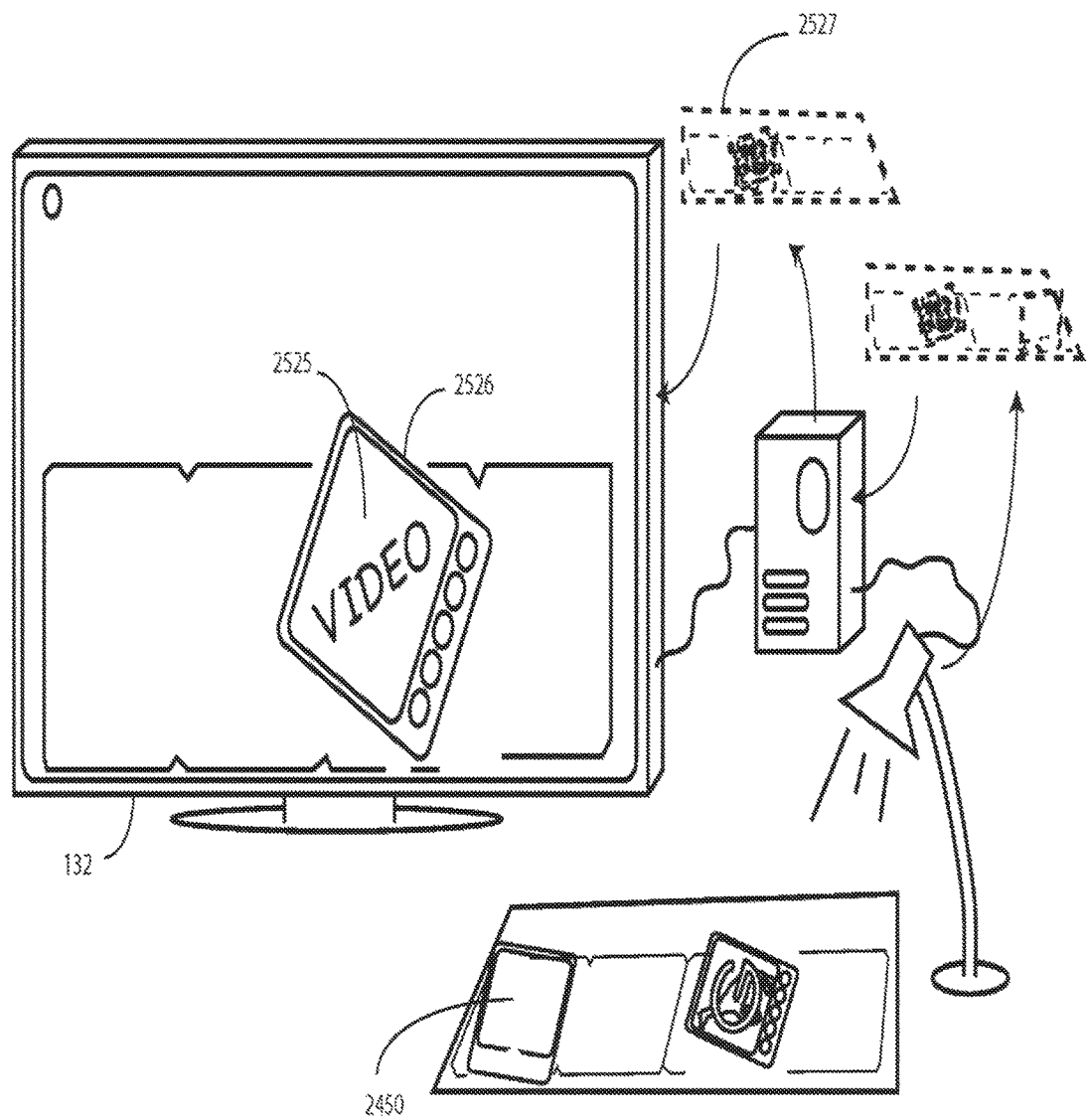

Embodiments of the invention can be configured with other features as well. Turning to FIGS. 24-25, illustrated therein is another embodiment of an educational feature that can be included. In FIG. 24, an educational flash card 650, such as the ones described above, has been placed beneath the camera 130. Additionally, a special effect card 2450 has been placed nearby. In this illustrative embodiment, the special effect card 2450 is a video card. When the special effect card 2450 is detected, the education module (171) can be configured to present a special effect on the adjacent card, i.e., educational flash card 650. Since this special effect card 2450 is a video card, the education module (171) can be configured to present video data in the augmented image data, where the video data corresponds to the special marker (152) on the educational flash card 650. In one embodiment, this only occurs upon the education module (171) detecting the presence of the special effect card 2450. As shown in FIG. 25, video 2525 is presented on the educational flash card image 2526 presented on the display 132. Note that in this illustrative embodiment, the special effect card 2450 is not presented on the display. The education module (171) has removed it from the augmented image data 2527.

In one embodiment, the educational flash cards described herein can be packaged and sold with the following items: a card with a built in marker, a web or document camera and customized augmented reality software. As described above, when the user places the educational flash card under the camera, a three-dimensional modeled letter in upper and lower case can be displayed on a computer monitor or interactive white board. The letter can be fun, whimsical looking and brightly colored. The letter may feature texturing that resembles the animal that the letter represents. A sound effect can play that vocalizes the name of the letter and the phonic sounds the letter makes. These sounds can be recorded clearly and correctly in plain English female voice with no accents. The sounds can be repeated for reinforcement by pressing the appropriate virtual button on the educational card. The following tables present some of the animals and corresponding audio sounds and animations that can be used in accordance with embodiments of the present invention:

TABLE 1

| Animal | Environment | Audio | Animations |
|---|---|---|---|
| Alligator | Jungle | Jungle sounds, Alligator hiss | Eats, walk, swim |
| Bear | Mountain | Mountain/Wilderness sounds, Growl | Eats, walk, stand and growl |
| Cow | Farm | Farm sounds, Moo | Eats, walks |
| Dolphin | Ocean | Ocean sounds, dolphin squeak | Eats, swims, jumps and does flip |
| Elephant | Jungle | Jungle sounds, elephant trumpet sound | Eats, walk, trumpet from trunk |
| Frog | Jungle | Jungles sounds, tree frog croaking sound | Eats, Jumps |
| Giraffe | Jungle | Jungle sounds, giraffe noise | Eats, walks |
| Horse | Farm | Farm sounds, horse whinny | Eats, walks, jumps, reares back on hind legs |
| Iguana | Jungle | Jungle sounds, Iguana hiss | Eats, walks, hiss, run |
| Jellyfish | Ocean | Ocean Sounds, bubbles sound | Eats, swims |
| Kangaroo | Desert | Desert/windy sounds, Kangaroo noise | Eats, Jumps, Joey in pouch |
| Lion | Jungle | Jungle sounds, Lion roar | Eats, walks, roars toward camera |
| Moose | Mountain | Mountain sounds, Moose noise | Eats, walks, rub tree |

TABLE 2

| Animal | Environment | Sounds | Animations |
|---|---|---|---|
| Narwhal | Ocean | Ocean Sounds, whale call | Eats, swims, raise horn, blow water |
| Orangutan | Jungle | Jungle Sounds, Orangutan sounds | Eats, hangs from tree |

TABLE 2-continued

| Animal | Environment | Sounds | Animations |
| --- | --- | --- | --- |
| Peacock | Farm | Farm sounds | Eats, walks, spread feathers |
| Quail | Mountain | Mountain sounds, quail coo | Eats, flies |
| Rooster | Farm | Farm sounds, rooster call | Eats, rooster call |
| Shark | Ocean | Ocean sounds, shark noise | Eats, swim |
| Toucan | Jungle | Jungle sounds, toucan call | Eats, flies |
| Unau | Jungle | Jungle sounds | Eats, hangs from tree, |
| Vulture | Desert | Desert sounds, vulture call | Eats, flies |
| Wolf | Mountain | Mountain sounds, Wolf howl | Eats, walks, howls at the moon |
| XRAY Fish | Ocean | Ocean sounds, bubbling sounds | Eats, swims |
| Yak | Mountain | Mountain sounds, yak sounds | Eats, walks |
| Zebra | Desert | Desert sounds, Zebra whinny | Eats, walks |

Further, the following dolch words can be used with embodiments of the present invention:

TABLE 3

PRE-K

| A | And | Away | Big | Blue | Can | Come |
| --- | --- | --- | --- | --- | --- | --- |
| Down | Find | For | Funny | Go | Help | Here |
| I | In | Is | It | Jump | Little | Look |
| Make | Me | My | Not | One | Play | Red |
| Run | Said | See | The | Three | To | Two |
| Up | We | Where | Yellow | you | | |

TABLE 4

Kindergarten

| All | Am | Are | At | Ate | Be | Black |
| --- | --- | --- | --- | --- | --- | --- |
| Brown | But | Came | Did | Do | Eat | For |
| Get | Good | Have | He | Into | Like | Must |
| New | No | Now | On | Our | Out | Please |
| Pretty | Ran | Ride | Saw | Say | She | So |
| Soon | That | There | They | This | Too | Under |
| Want | Was | Well | Went | What | White | Will |
| With | Yes | Fly | Swim | Walk | Green | |

As described above, if a sentence is formed such as "Look at the Dolphin Walk" the customized education module will know that a dolphin cannot walk and three-dimensional dolphin can shake its head and the teacher can explain that dolphins can only swim and jump.

Some words can be configured to cause an animation to occur if an animal card is present under the camera. Words like "Big" and "Little" can make the three-dimensional animal model get larger or smaller. Words like "say" and "said" can trigger the animal's sound to be played. Similarly, some words in can cause the three-dimensional animal models to change to the appropriate color. Students will be able to make blue lions and red sharks.

Other features can be included as well. For example, in one embodiment the cards will be able to interact in order to spell words. For example, if the user presents the cards with "C" "A" and "T" to the camera in the correct order, a sound effect should play and a modeled image of a cat will be displayed. There are many different ways the software can be modified to incorporate more user interactivity. Here are some examples: A user can introduce their own objects into the camera's view and have the three-dimensional object react and interact with the new object. A user can purchase an add-on card like a pond or food and have the animal interact with the water and eat. A marker can be printed on a t-shirt and when the user steps in front of the camera, they are transformed into a gorilla.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed:

1. A computer-implemented method of teaching a subject, comprising:
   capturing one or more video images of at least one educational tool, wherein the at least one educational tool comprises a plurality of educational tools comprising a visible object disposed thereon, wherein the visible objects of a portion of the plurality of educational tools can be arranged by a user; and
   augmenting the one or more video images for presentation on a display with an education module by superimposing a two-dimensional representation of an educational three-dimensional object on the one or more video images of the educational tool, wherein the two-dimensional representation of the three dimensional representation of the educational object confirms when the portion of educational tools is arranged correctly, and wherein the visible objects of the portion of educational tools comprise characters.

2. The method of claim 1, wherein the visible objects of the portion of the plurality of educational tools comprise different characters disposed thereon.

3. The method of claim 2, wherein the visible objects of the portion of educational tools further comprise symbols.

4. The method of claim 3, wherein the characters comprise numbers and the symbols comprise mathematical symbols.

5. The method of claim 1, wherein the method further comprises:
   detecting an object covering an actuation target disposed on the at least one educational flash card; and
   generating audio data comprising an audible representation of the visual objects disposed on the at least one educational flash card.

6. The method of claim 1, wherein the educational three-dimensional object comprises an avatar, wherein the education module is further configured to cause the avatar to confirm when the portion of educational tools is arranged correctly.

7. The method of claim 6, wherein the education module is further configured to cause the avatar to answer by one of nodding a head up and down or shaking the head left and right.

8. The method of claim 6, wherein the avatar comprises an animal.

9. An educational system, comprising:
an input configured to receive an image data; and
an education module, configured to:
   detect a character on at least one of a plurality of educational tools present in the image data;
   augment the image data by inserting a two-dimensional representation of an educational three-dimensional object into the image data to create augmented image data, wherein the character and the educational three-dimensional object are related by a predetermined criterion; and
   detect movement of the at least one of a plurality of educational tools present in the image data and to cause the educational three-dimensional object to move in a corresponding manner, wherein the educational three-dimensional object moves as the educational tool moves.

10. The system of claim 9, wherein the character on the at least one of a plurality of educational tools comprises a number or symbol.

11. The system of claim 9, wherein the education module is further configured to:
detect an object covering an actuation target disposed on the at least one of a plurality of educational tools; and
generate audio data comprising an audible pronunciation of the character disposed on the at least one of the plurality of educational tools.

12. The system of claim 9, wherein the visible objects of a portion of the plurality of educational tools can be arranged by a user, and wherein the two-dimensional representation of the three dimensional representation of the educational object confirms when the portion of educational tools is arranged correctly.

13. The system of claim 12, wherein the educational three-dimensional object comprises an avatar, and wherein the education module is further configured to cause the avatar to confirm when the portion of educational tools is arranged correctly.

14. The system of claim 13, wherein the education module is further configured to cause the avatar to answer by one of nodding a head up and down or shaking the head left and right.

15. The system of claim 13, wherein the avatar comprises an animal.

16. The method of claim 1, wherein the at least one educational tool comprises a flash card.

17. The method of claim 1, wherein the at least one education tool comprises a poster.

18. The system of claim 9, wherein the at least one educational tool comprises a flash card.

19. The system of claim 9, wherein the at least one education tool comprises a poster.

* * * * *